United States Patent
Arrasvuori

(10) Patent No.: US 9,442,942 B2
(45) Date of Patent: Sep. 13, 2016

(54) METHOD, APPARATUS AND COMPUTER PROGRAM PRODUCT FOR DYNAMIC AND VISUAL OBJECT SEARCH INTERFACE

(75) Inventor: Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 653 days.

(21) Appl. No.: 13/277,503

(22) Filed: Oct. 20, 2011

(65) Prior Publication Data
US 2013/0103680 A1    Apr. 25, 2013

(51) Int. Cl.
*G06F 17/30* (2006.01)
(52) U.S. Cl.
CPC ....... *G06F 17/301* (2013.01); *G06F 17/30637* (2013.01); *G06F 17/30663* (2013.01); *G06F 17/30678* (2013.01); *G06F 17/30696* (2013.01)

(58) Field of Classification Search
USPC .......................................... 707/759
See application file for complete search history.

(56) References Cited

U.S. PATENT DOCUMENTS

| | | | |
|---|---|---|---|
| 7,475,072 B1 * | 1/2009 | Ershov | |
| 7,765,184 B2 | 7/2010 | Makela | |
| 8,452,784 B2 | 5/2013 | Arrasvuori | |
| 8,700,303 B2 | 4/2014 | Uusitalo | |
| 8,826,182 B2 | 9/2014 | Arrasvuori | |
| 8,890,818 B2 | 11/2014 | Arrasvuori et al. | |
| 2002/0073056 A1 * | 6/2002 | Broster et al. | 707/1 |
| 2007/0288498 A1 * | 12/2007 | Dietz et al. | 707/102 |
| 2009/0192703 A1 | 7/2009 | Hess et al. | |
| 2011/0099180 A1 | 4/2011 | Arrasvuori | |
| 2011/0196864 A1 * | 8/2011 | Mason et al. | 707/728 |
| 2011/0307174 A1 | 12/2011 | Uusitalo | |
| 2012/0068941 A1 | 3/2012 | Arrasvuori et al. | |
| 2013/0061181 A1 | 3/2013 | Arrasvuori | |

OTHER PUBLICATIONS

Search Cloud.net [online] [retrieved Jan. 20, 2016]. Retrieved from the Internet: <URL: http://web.archive.org/web/20110925201305/ http://searchcloud.net/>. (dated Sep. 25, 2011) 1 page.

* cited by examiner

*Primary Examiner* — Albert Phillips, III
(74) *Attorney, Agent, or Firm* — Alston & Bird LLP

(57) ABSTRACT

Provided herein are a method, apparatus and computer program product for dynamically and visually interfacing with a device to locate information and objects using a dynamic graphical interface to select and adjust the weight afforded to individual search criterion and a search. Example methods may provide for display of a search target, provide for display of a first search criterion disposed at a first distance from the search target where the first distance corresponds to a first search criterion weight, and provide for display of a second search criterion disposed at a second distance from the search target, where the second distance corresponds to a second search criterion weight. Methods may further include providing for searching the search target using the first search criterion afforded the first search criterion weight and the second search criterion afforded the second search criterion weight.

20 Claims, 19 Drawing Sheets

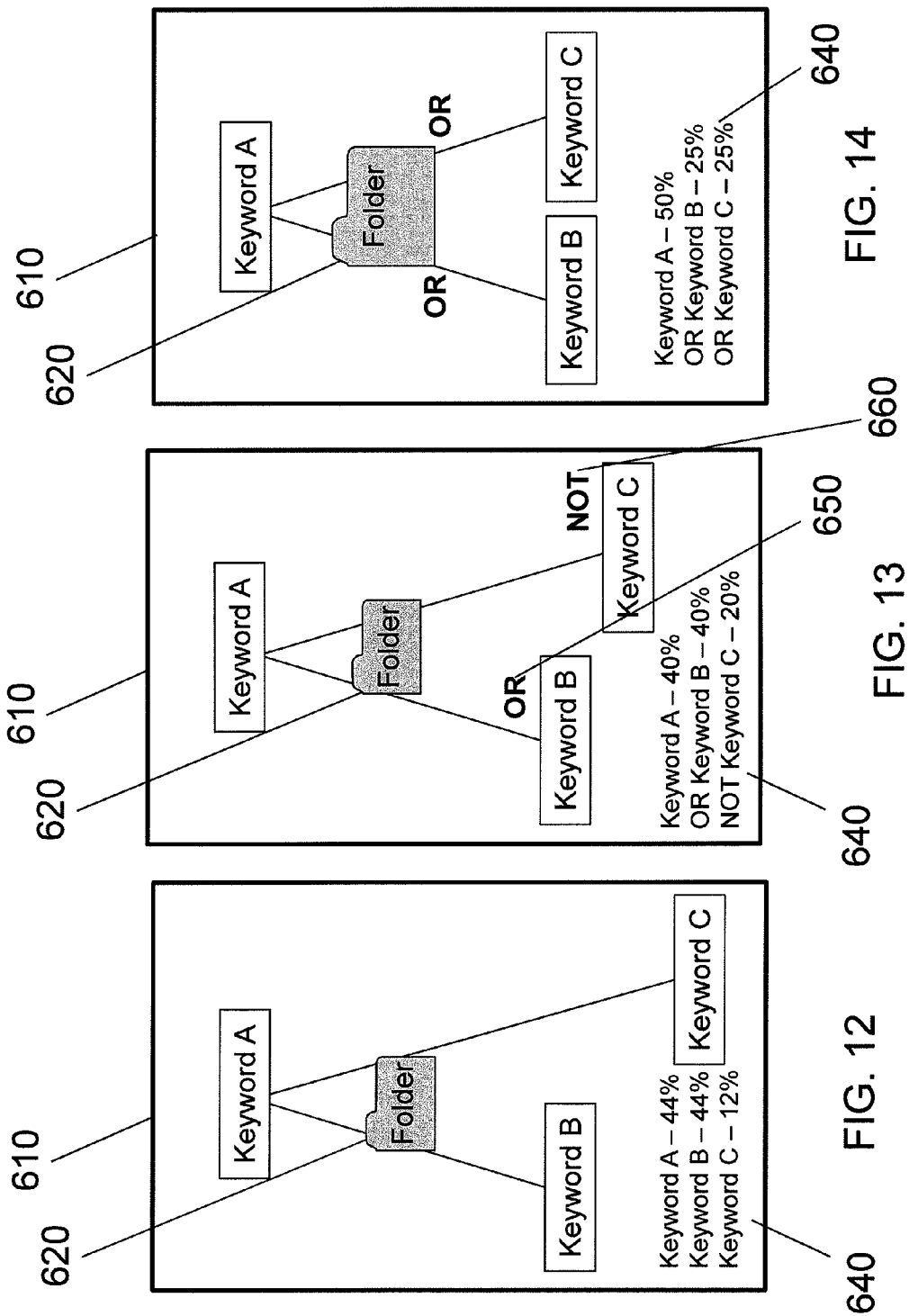

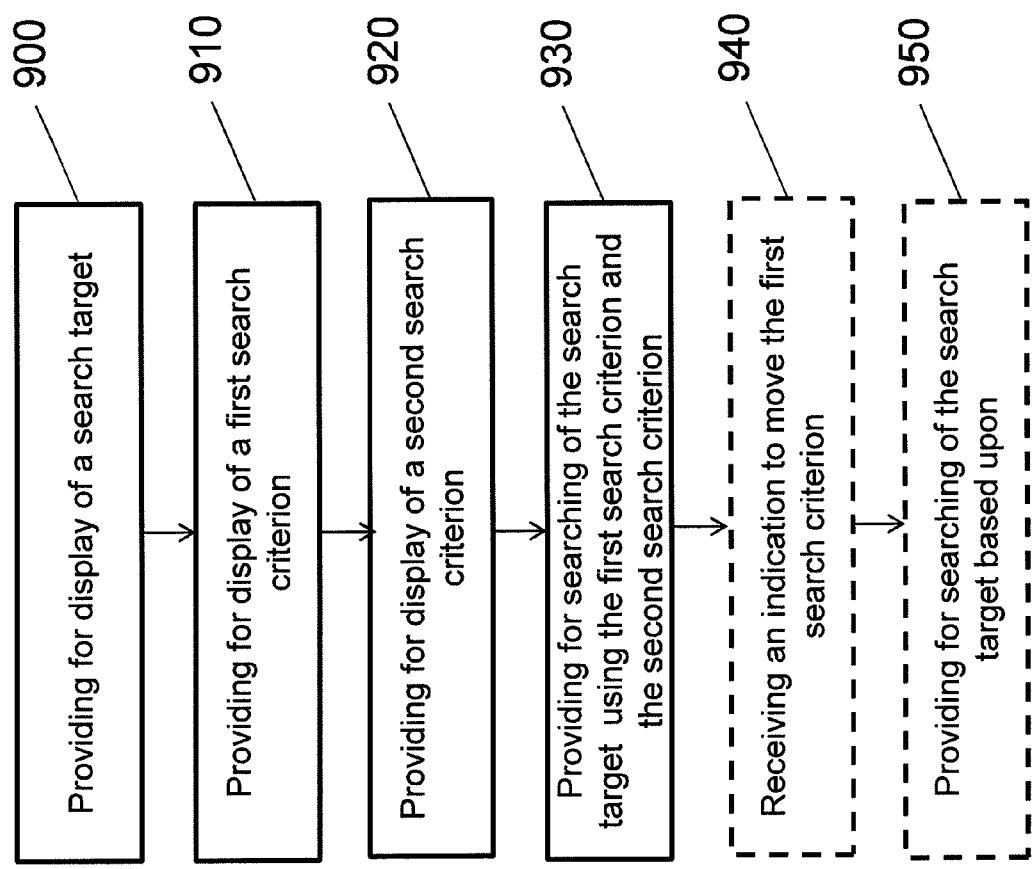

METHOD, APPARATUS AND COMPUTER PROGRAM PRODUCT FOR DYNAMIC AND VISUAL OBJECT SEARCH INTERFACE

TECHNOLOGICAL FIELD

Example embodiments of the present invention relate generally to a dynamic and visual object search interface, and more particularly, to a method of searching for objects using a dynamic graphical interface to select and adjust the weight afforded individual search criterion and the search target.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices may be capable of storing many gigabytes of information and objects within a local memory and may be capable of accessing information and objects stored remotely, such as on a network server or found on the Internet. As such devices are capable of accessing such vast quantities of objects, finding and retrieving objects of particular interest may be more difficult. Locating a single object from potentially millions of objects may be a formidable task, particularly when details regarding the object sought are not entirely known. Therefore, it may be desirable to provide a searching mechanism which may improve and enhance the ability to search for individual or groups of objects.

SUMMARY

In general, an example embodiment of the present invention provides an improved method, apparatus and computer program product for dynamically and visually interfacing with a device to locate objects using a dynamic graphical interface to select and adjust the weight afforded to individual search criterion and a search.

In particular, a method of example embodiments includes providing for display of a search target, providing for display of a first search criterion disposed at a first distance from the search target where the first distance corresponds to a first search criterion weight, and providing for display of a second search criterion disposed at a second distance from the search target, where the second distance corresponds to a second search criterion weight. The method may further include searching the search target using the first search criterion afforded the first search criterion weight and the second search criterion afforded the second search criterion weight. The method may also include receiving an indication to move the first search criterion to a third distance from the search target with the third distance corresponding to a new first search criterion weight, calculating a new second search criterion weight in response to the indication to move the first search criterion to a third distance from the search target, and searching the search target using the first search criterion afforded the new first search criterion weight and the second search criterion afforded the new second search criterion weight. The search target may be a search location.

The method may optionally include providing for display of search results and updating the search results in response to the first search criterion being moved from a first distance to the search target to a third distance to the search target. The method may include providing for display of search results and ranking the search results by relevance in response to the first search criterion being afforded the first search criterion weight and the second search criterion being afforded the second search criterion weight. The method may include re-ranking the search results by relevance in response to at least one of the first search criterion weight and the second search criterion weight being changed. The first search criterion weight may be changed in response to the distance between the first search criterion and the search target being changed.

According to another embodiment of the present invention, an apparatus is provided. The apparatus may include at least one processor and at least one memory including computer program code. The at least one memory and the computer program code may be configured to, with the at least one processor, cause the apparatus to provide for display of a search target, provide for display of a first search criterion disposed at a first distance from the search target with the first distance corresponding to a first search criterion weight, and provide for display of a second search criterion disposed at a second distance from the search target with the second distance corresponding to a second search criterion weight. The apparatus may further be caused to search the search target using the first search criterion afforded the first search criterion weight and the second search criterion being afforded the second search criterion weight. The apparatus may optionally be caused to receive an indication to move the first search criterion to a third distance from the search target with the third distance corresponding to a new first search criterion weight, calculate a new second search criterion weight in response to the indication to move the first search criterion to a third distance from the search target, and search the search target using the first search criterion afforded the new first search criterion weight and the second search criterion afforded the new second search criterion weight. The search target may be a search location. The apparatus may be caused to provide for display of search results and update the search results in response to the first search criterion being moved from a first distance to the search target to a third distance from the search target.

The apparatus may optionally be caused to provide for display of search results and rank the search results by relevance in response to the first search criterion being afforded the first search criterion weight and the second search criterion being afforded the second search criterion weight. The apparatus may be caused to re-rank the search results by relevance in response to at least one of the first search criterion weight and the second search criterion weight being changed. The first search criterion weight may be changed in response to the distance between the first search criterion and the search target being changed.

A further embodiment of the invention may include a computer program product including at least one computer-readable storage medium having computer-executable program code instructions stored therein. The computer executable program code instructions may include program code instructions for providing for display of a search target, program code instructions for providing for display of a first search criterion disposed at a first distance from the search target, where the first distance corresponds to a first search criterion weight, and program code instructions for providing for display of a second search criterion disposed at a second distance from the search target, where the second distance corresponds to a second search criterion weight. The computer program product may further include program code instructions for searching the search target using the first search criterion afforded the first search criterion weight and the second search criterion afforded the second search criterion weight. The computer program product may optionally include program code instructions for receiving an indication to move the first search criterion to a third distance from the search target with the third distance corresponding to a new first search criterion weight, program code instructions for calculating a new second search criterion weight in response to the indication to move the first search criterion to a third distance from the search target, and program code instructions for searching the search target using the first search criterion afforded the new first search criterion weight and the second search criterion afforded the new second search criterion weight. The search target may be a search location. The computer program product may also include program code instructions for providing for display of search results and program code instructions for updating the search results in response to the first search criterion being moved from a first distance to the search target to a third distance to the search target.

The computer program product may optionally include program code instructions for providing for display of search results and program code instructions for ranking the search results by relevance in response to the first search criterion being afforded the first search criterion weight and the second search criterion being afforded the second search criterion weight. The computer program product may include program code instructions for re-ranking the search results by relevance in response to at least one of the first search criterion weight and the second search criterion weight being changed.

According to another embodiment of the present invention, an apparatus is provided. The apparatus may include means to provide for display of a search target, means to provide for display of a first search criterion disposed at a first distance from the search target, where the first distance corresponds to a first search criterion weight, and means to provide for display of a second search criterion disposed at a second distance from the search target, where the second distance corresponds to a second search criterion weight. The apparatus may further include means to search the search target using the first search criterion afforded the first search criterion weight and the second search criterion being afforded the second search criterion weight. The apparatus may optionally include means to receive an indication to move the first search criterion to a third distance from the search target with the third distance corresponding to a new first search criterion weight, means to calculate a new second search criterion weight in response to the indication to move the first search criterion to a third distance from the search target, and means to search the search target using the first search criterion afforded the new first search criterion weight and the second search criterion afforded the new second search criterion weight. The search target may be a search location. The apparatus may include means to provide for display of search results and means to update the search results in response to the first search criterion being moved from a first distance to the search target to a third distance from the search target.

The apparatus may optionally include means to provide for display of search results and means to rank the search results by relevance in response to the first search criterion being afforded the first search criterion weight and the second search criterion being afforded the second search criterion weight. The apparatus may include means to re-rank the search results by relevance in response to at least one of the first search criterion weight and the second search criterion weight being changed. The first search criterion weight may be changed in response to the distance between the first search criterion and the search target being changed.

BRIEF DESCRIPTION OF THE DRAWINGS

Figure 1:
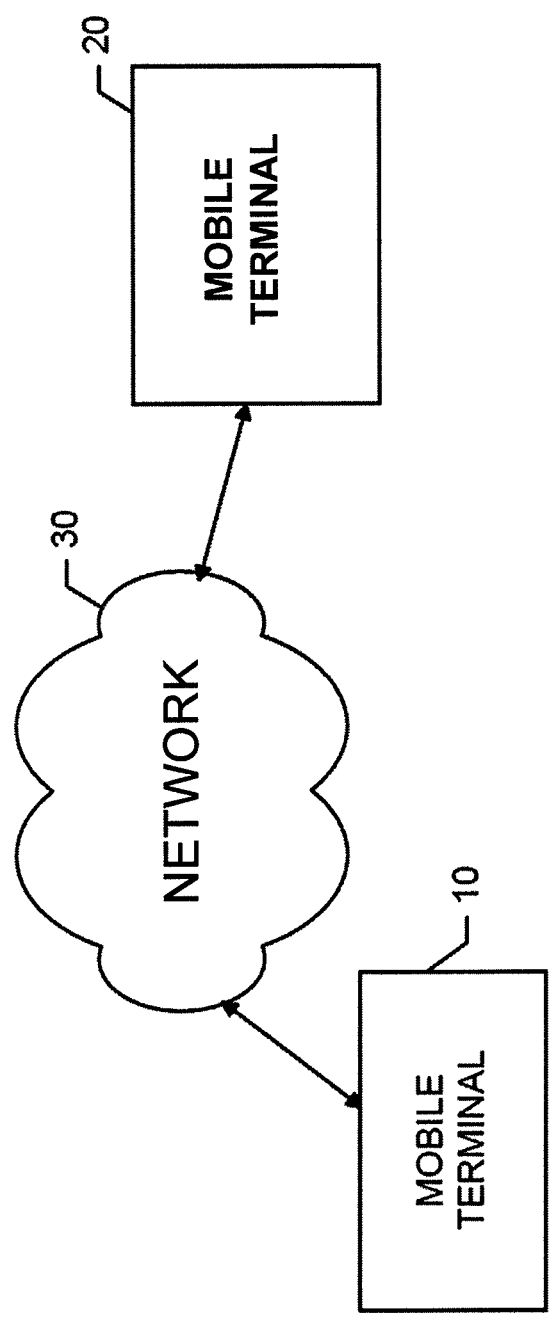
Figure 2:
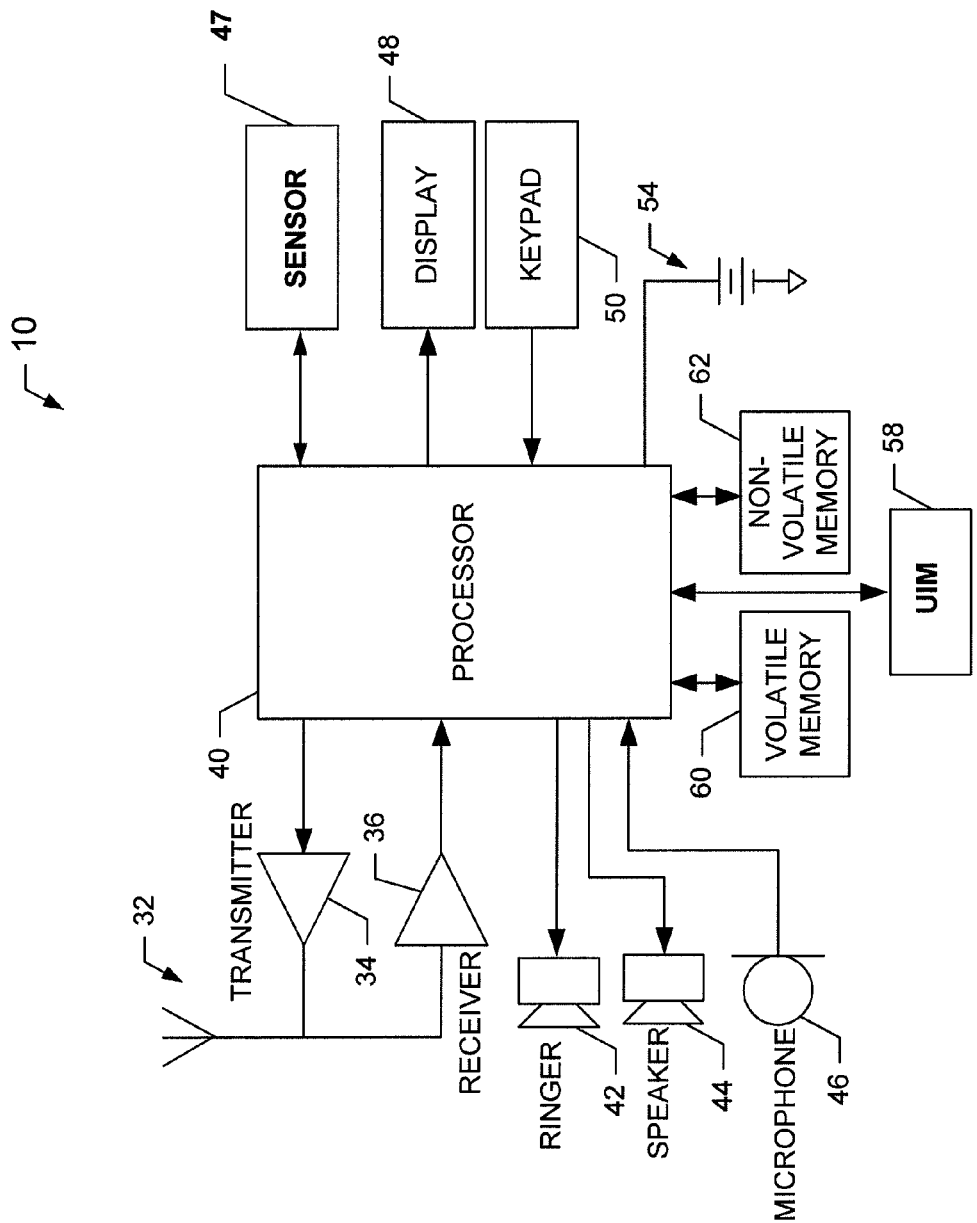
Figure 3:
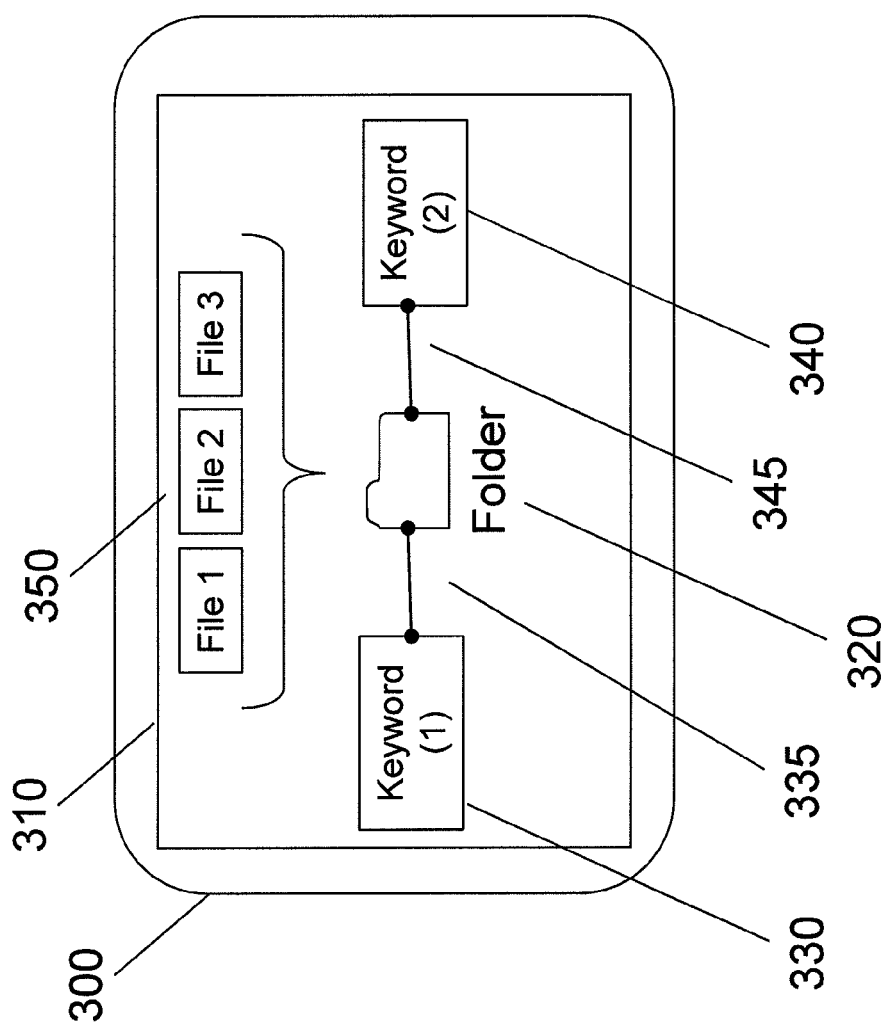
Figure 4:
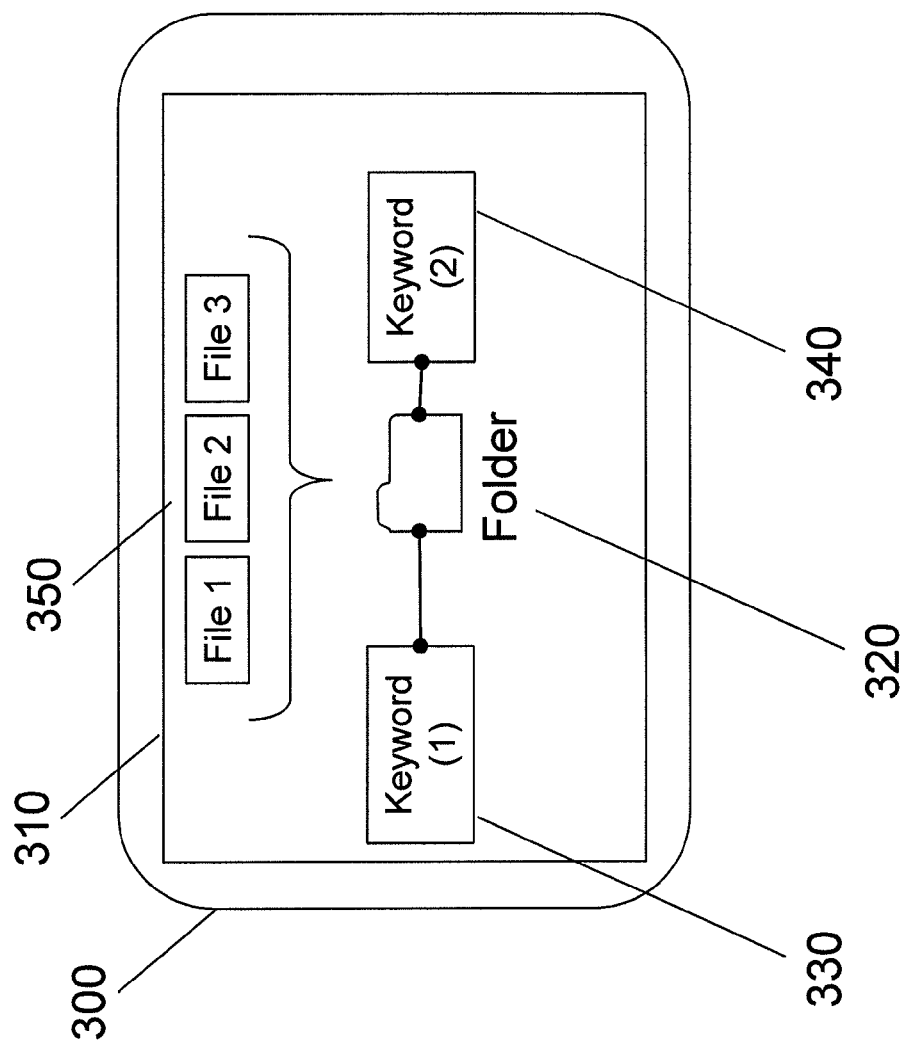
Figure 5:
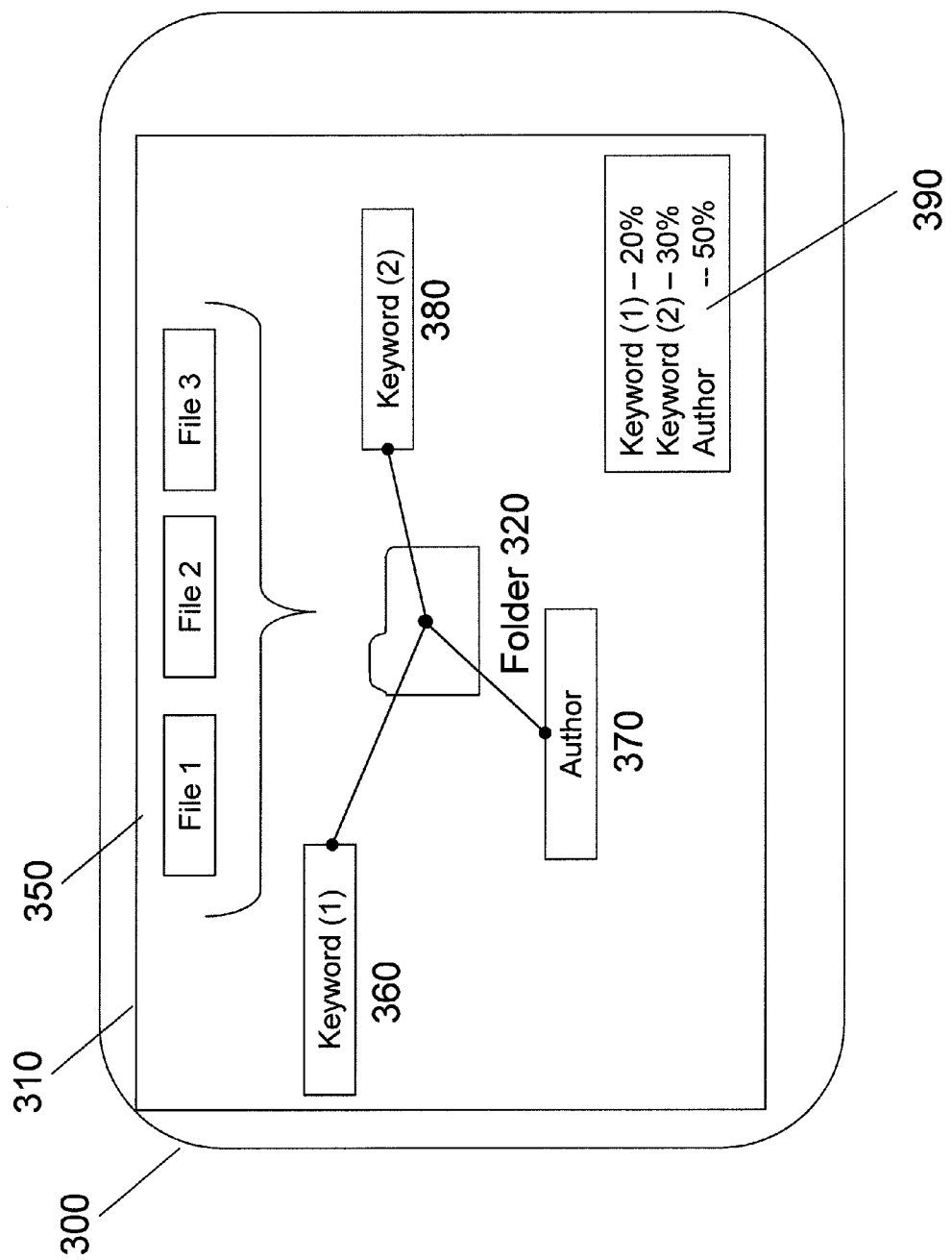
Figure 6:
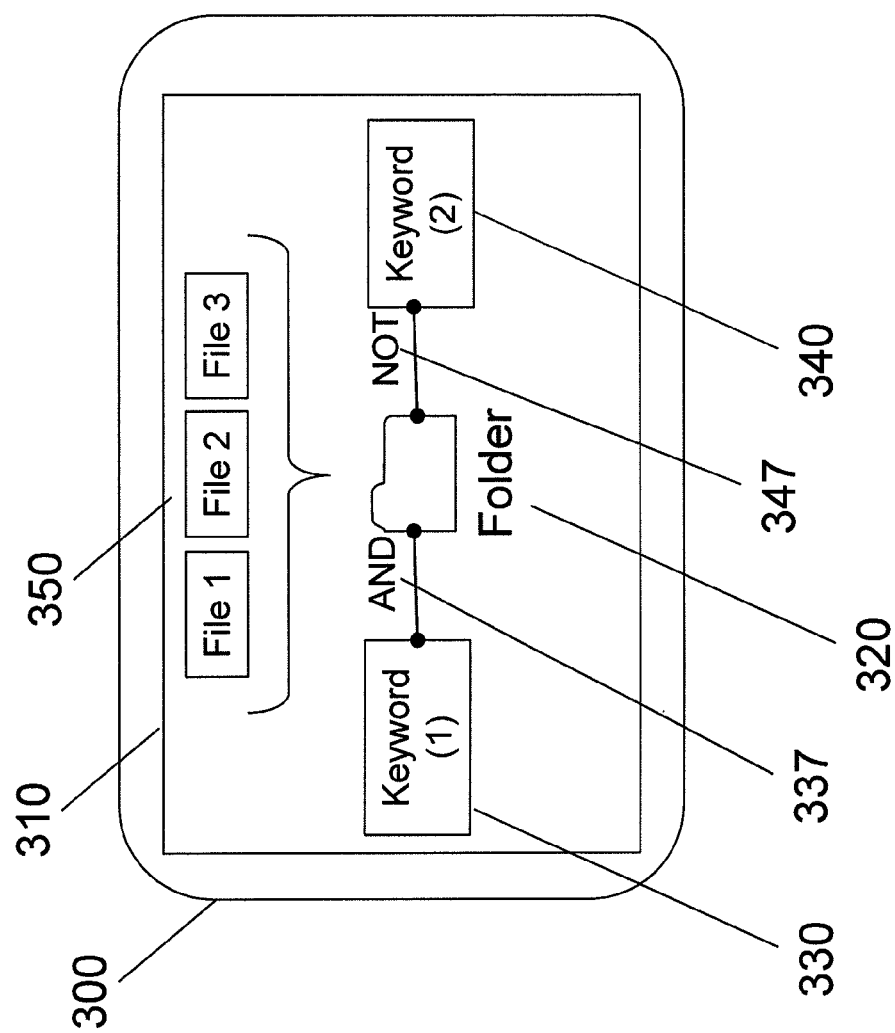
Figure 7:
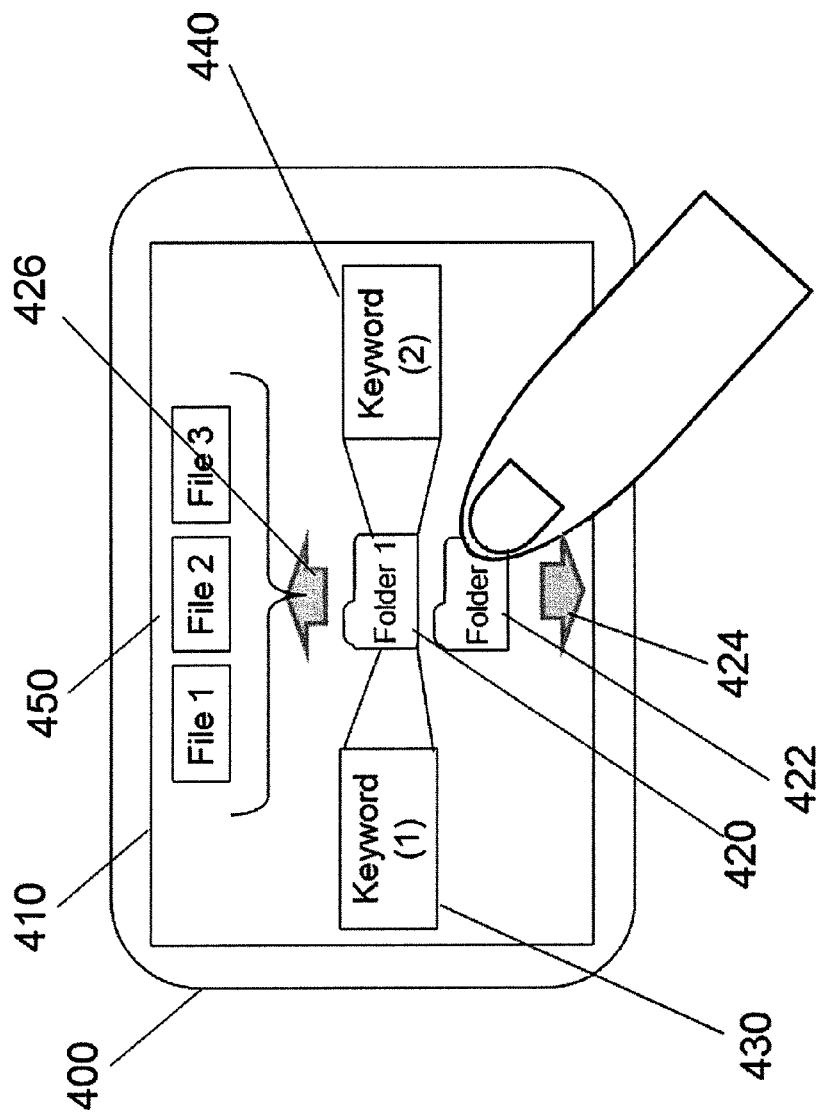
Figure 8:
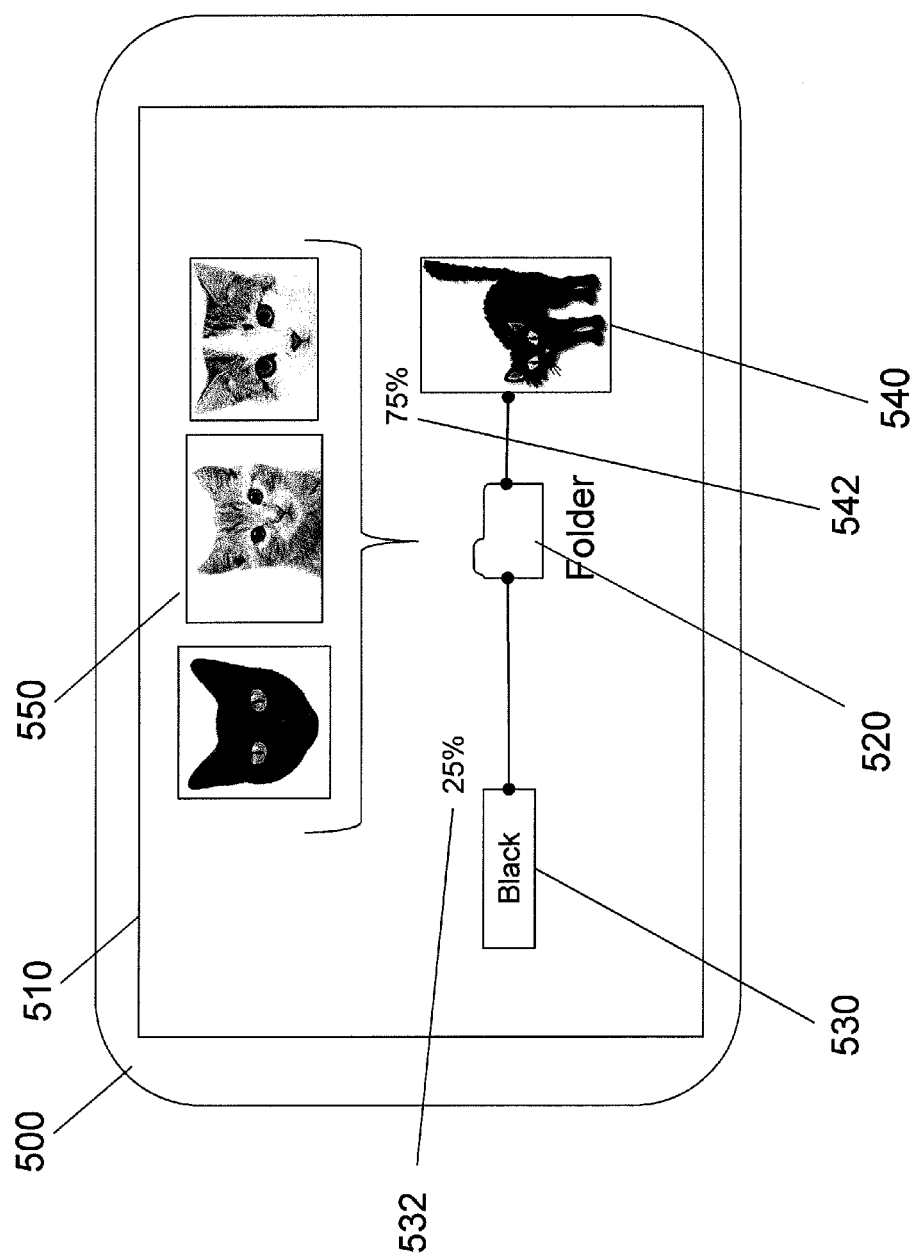
Figure 11:
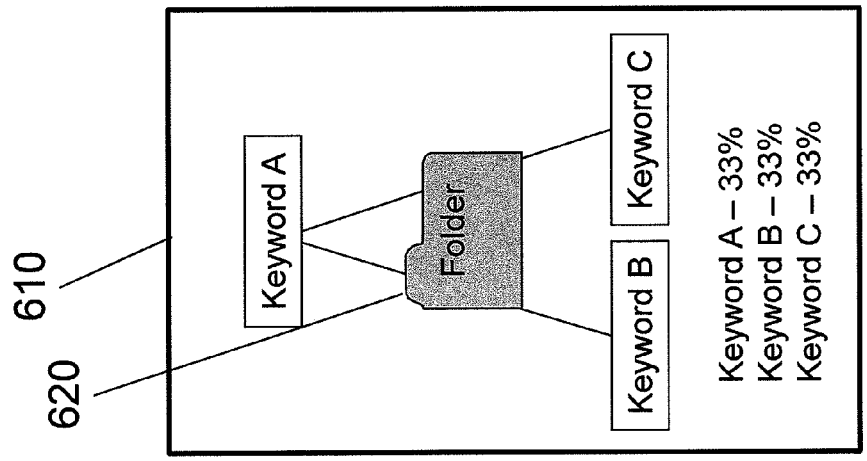
Figure 10:
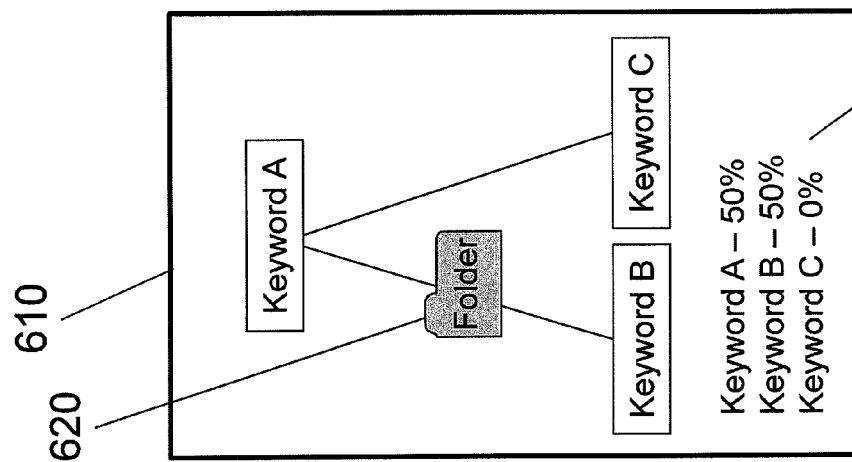
Figure 9:
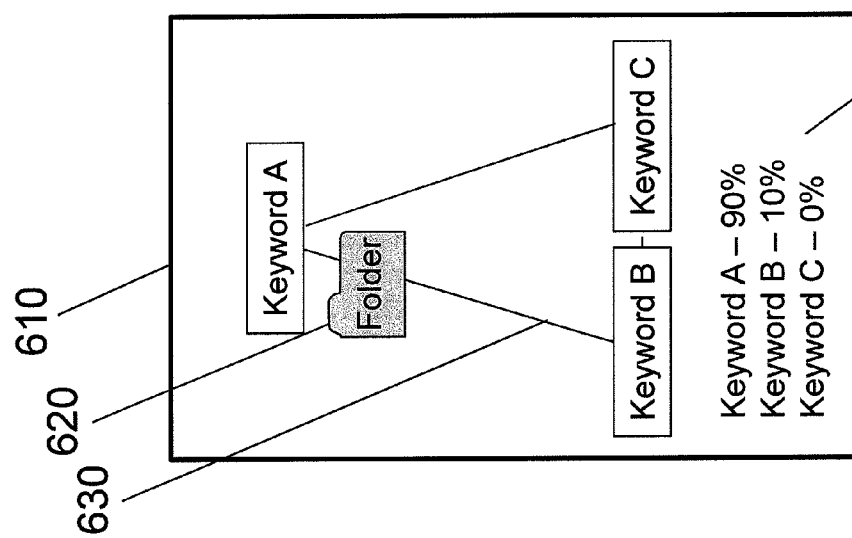
Figure 15:
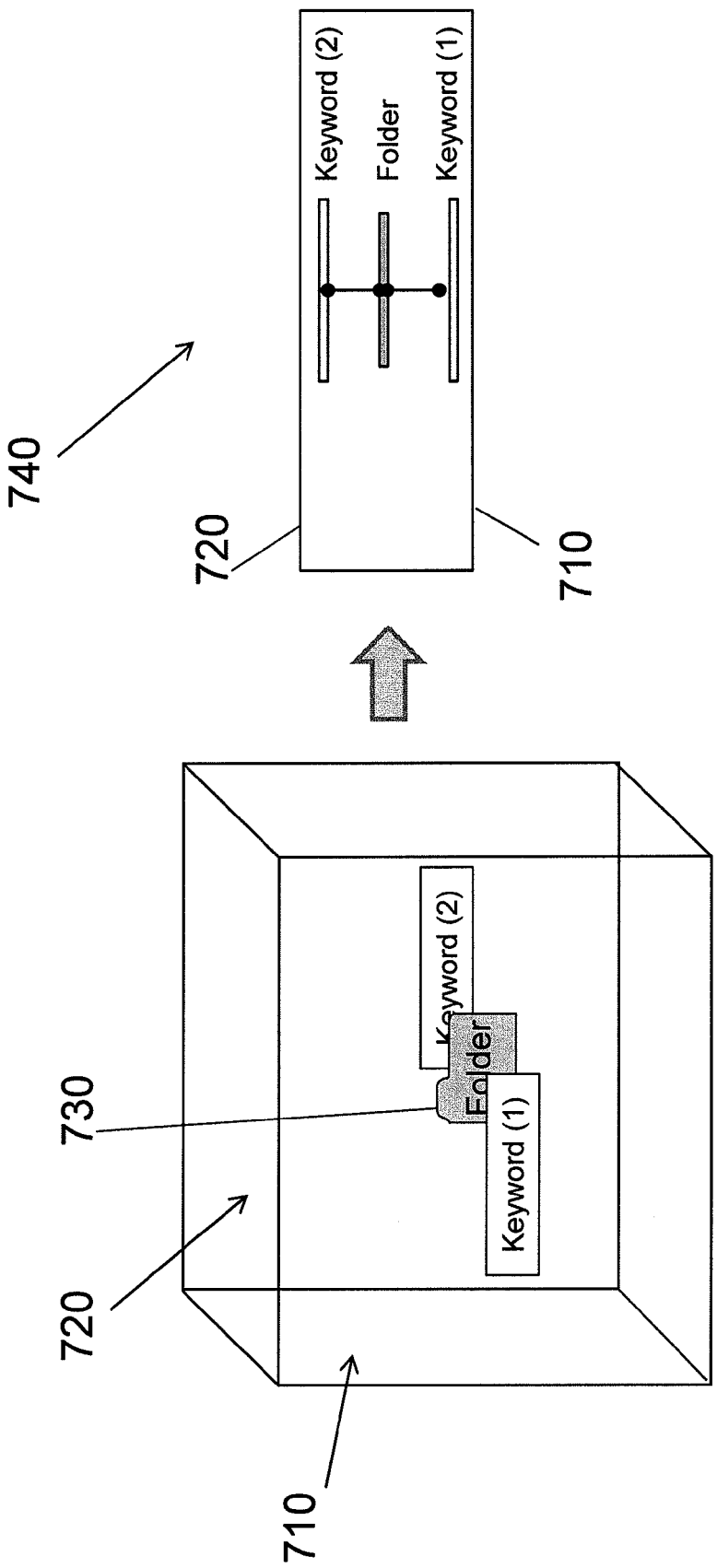
Figure 16:
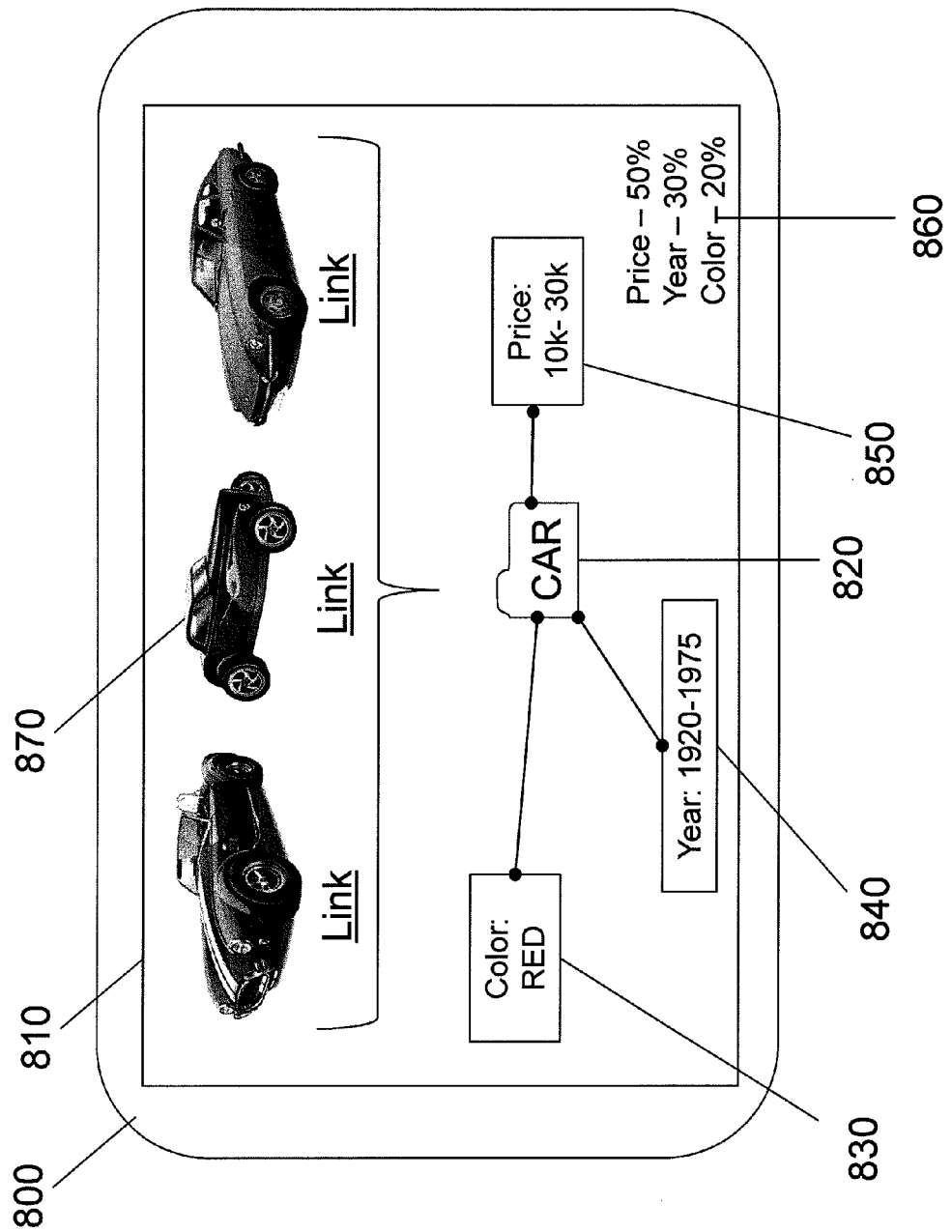
Figure 17:
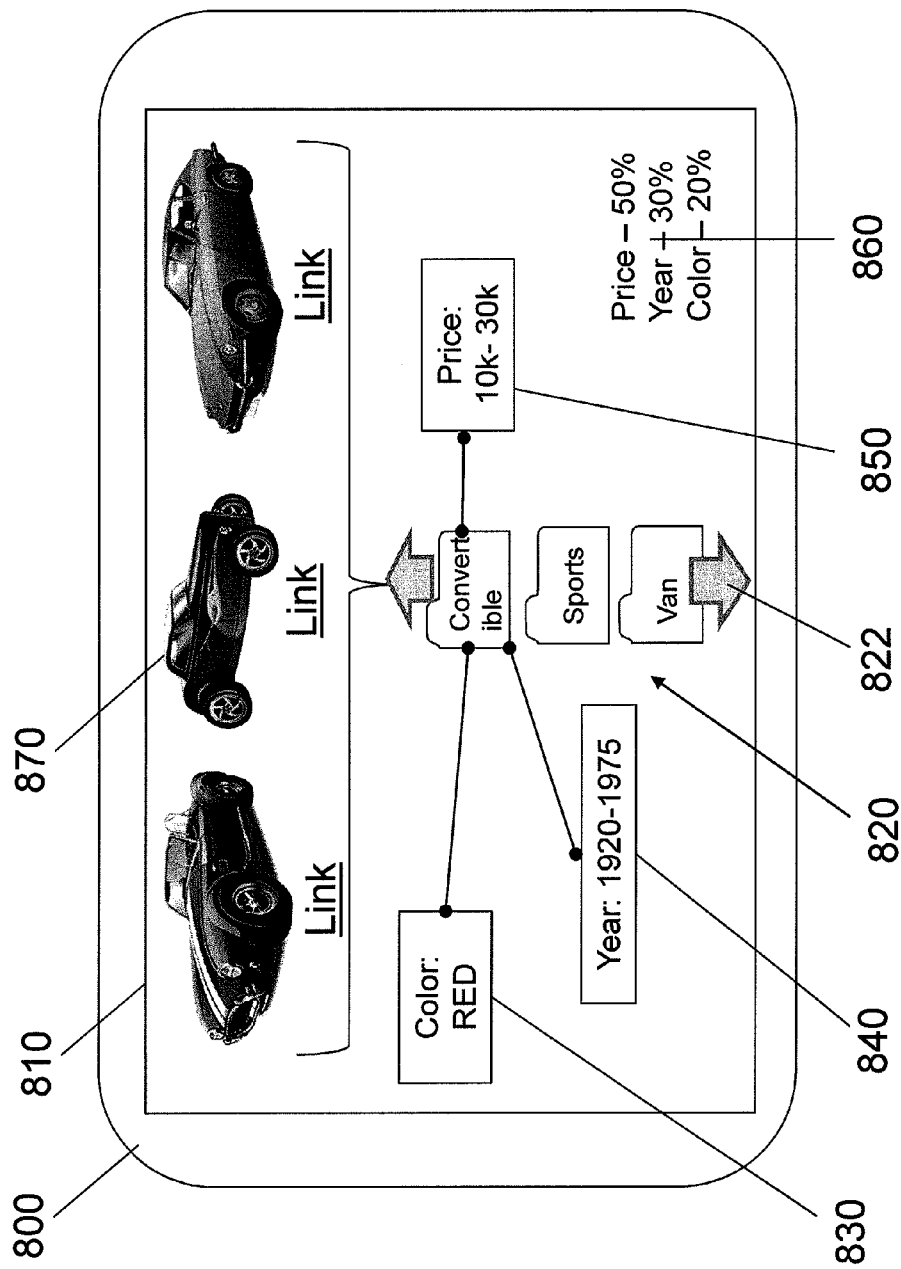
Figure 18:
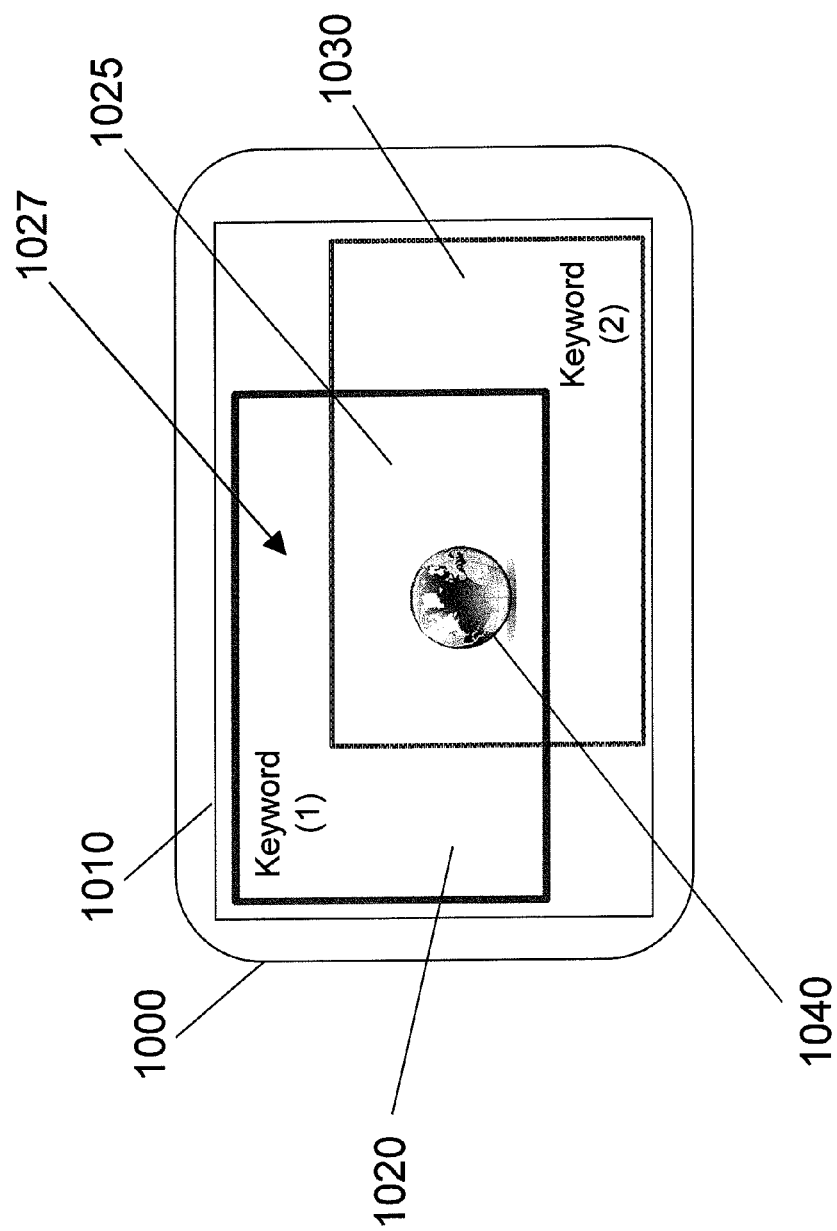
Figure 19:
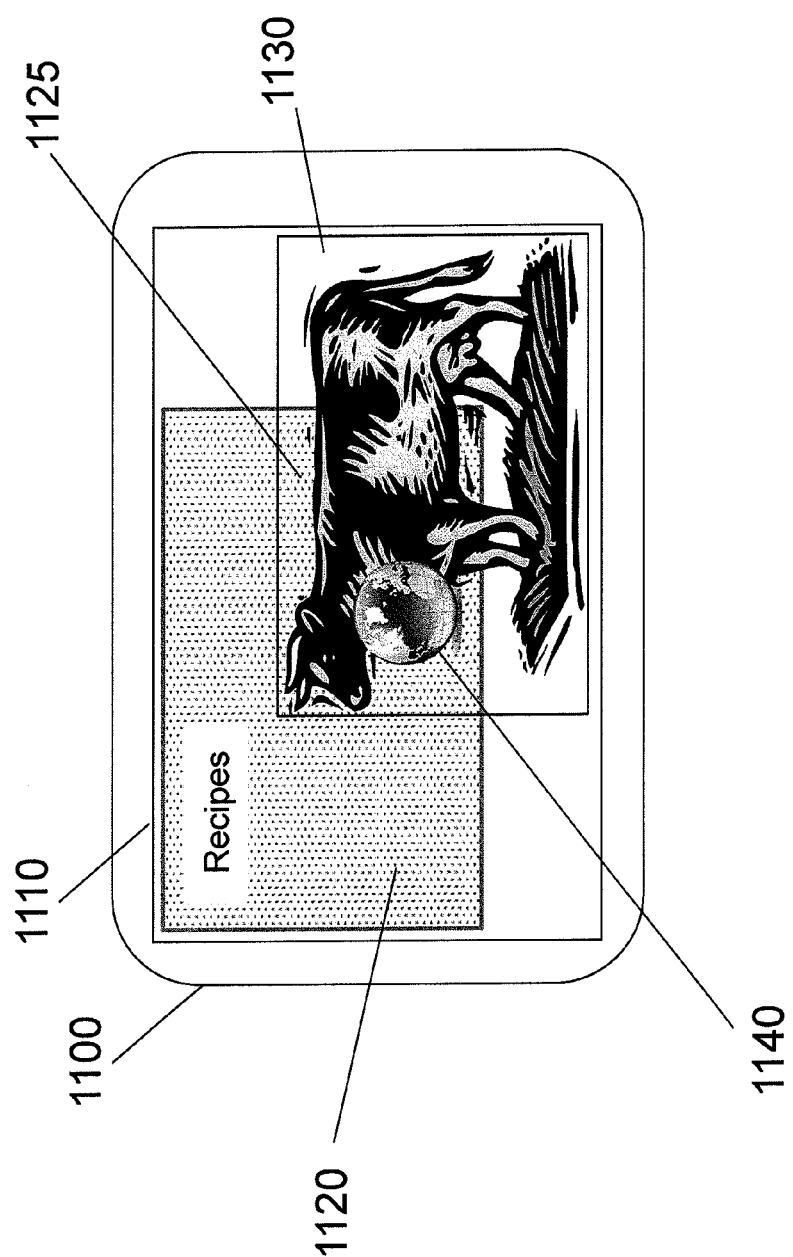
Figure 20:
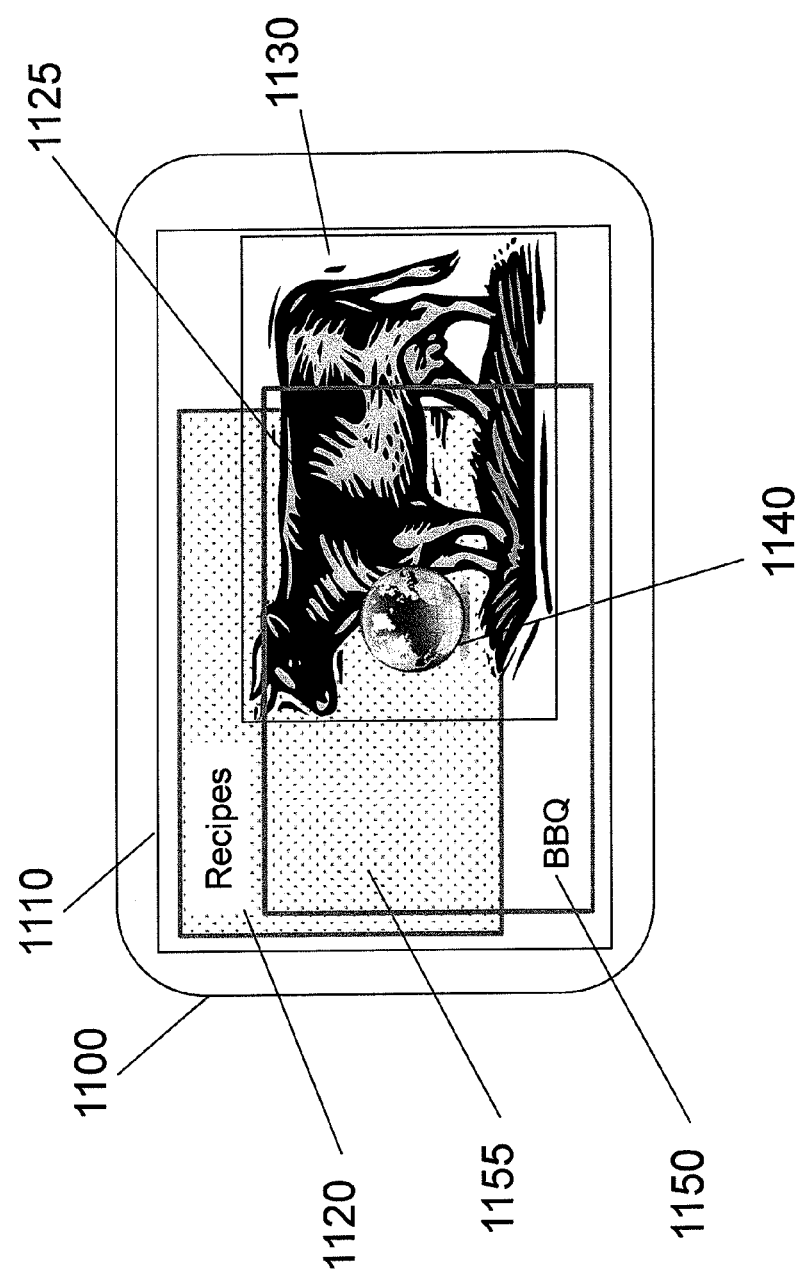
Figure 21:
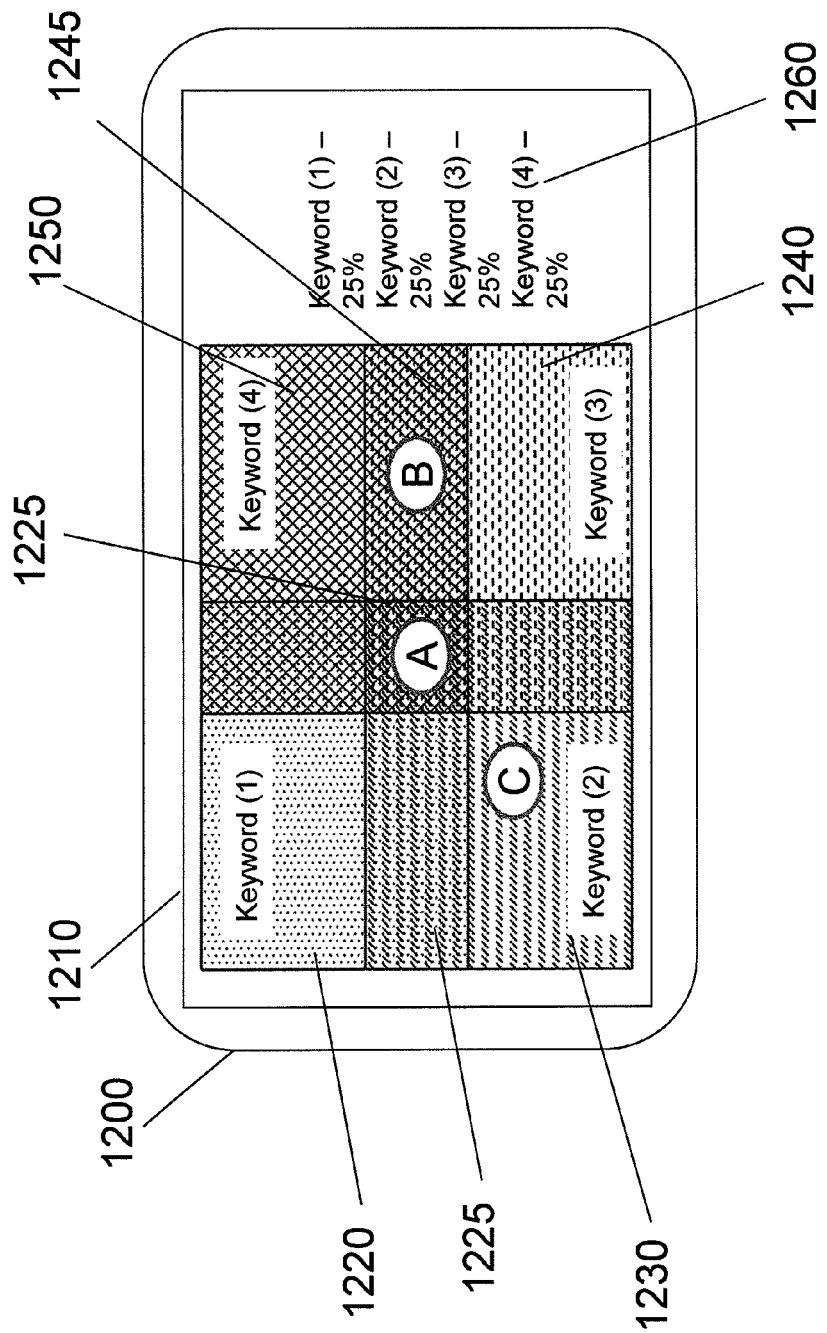
Figure 22:
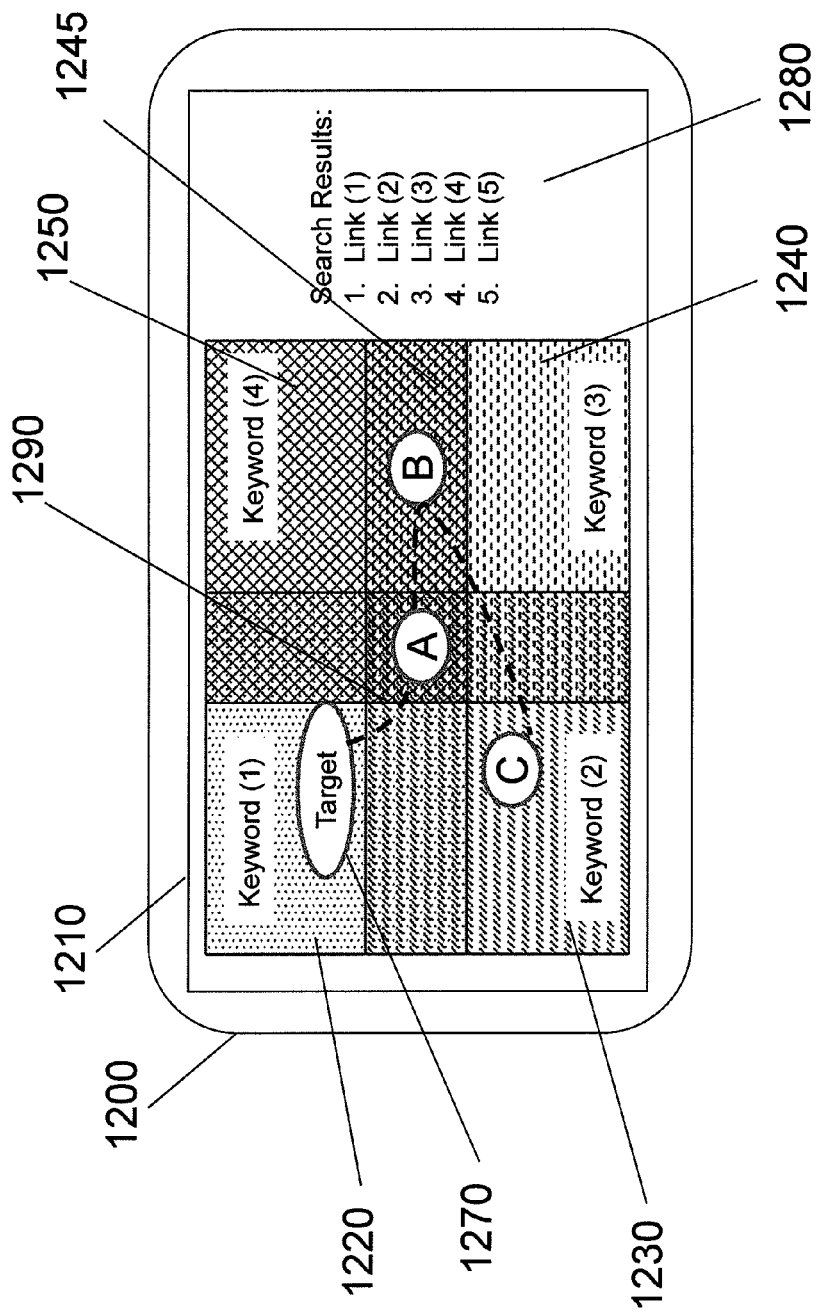

Having thus described certain example embodiments of the invention in general terms, reference will now be made to the accompanying drawings, which are not necessarily drawn to scale, and wherein:

FIG. 1 illustrates an communication system in accordance with an example embodiment of the present invention;

FIG. 2 is a schematic block diagram of a mobile device according to an example embodiment of the present invention;

FIG. 3 is an illustration of a mobile terminal implementing a dynamic and visual object search interface according to an example embodiment of the present invention;

FIG. 4 is an illustration of a mobile terminal implementing the dynamic and visual object search interface of FIG. 3 with a search criterion moved according to an example embodiment of the present invention;

FIG. 5 is an illustration of a mobile terminal implementing a dynamic and visual object search interface according to another example embodiment of the present invention;

FIG. 6 is an illustration of a mobile terminal implementing a dynamic and visual object search interface with Boolean operators according to another example embodiment of the present invention;

FIG. 7 is an illustration of a mobile terminal implementing a dynamic and visual object search interface with multiple search targets according to another example embodiment of the present invention;

FIG. 8 is an illustration of a mobile terminal implementing a dynamic and visual object search interface implementing an object as a search criterion according to another example embodiment of the present invention;

FIG. 9 is an illustration of a mobile terminal implementing a dynamic and visual object search interface according to another example embodiment of the present invention;

FIG. 10 is an illustration of a mobile terminal implementing the dynamic and visual object search interface of FIG. 9 with the search target moved according to another example embodiment of the present invention;

FIG. 11 is an illustration of a mobile terminal implementing the dynamic and visual object search interface of FIG. 10 with the search target enlarged according to another example embodiment of the present invention;

FIG. 12 is an illustration of a mobile terminal implementing a dynamic and visual object search interface according to yet another example embodiment of the present invention;

FIG. 13 is an illustration of a mobile terminal implementing the dynamic and visual object search interface of FIG. 12 with Boolean operators according to another example embodiment of the present invention;

FIG. 14 is an illustration of a mobile terminal implementing the dynamic and visual object search interface of FIG. 11 with Boolean operators according to another example embodiment of the present invention;

FIG. 15 is an illustration of a three-dimensional display implementing a dynamic and visual object search interface according to an example embodiment of the present invention;

FIG. 16 is an illustration of a mobile terminal implementing a dynamic and visual object search interface over a network according to an example embodiment of the present invention;

FIG. 17 is an illustration of a mobile terminal implementing a dynamic and visual object search interface over a network according to another example embodiment of the present invention;

FIG. 18 is an illustration of a mobile terminal implementing a dynamic and visual and visual search interface including search criterion areas according to an example embodiment of the present invention;

FIG. 19 is an illustration of a mobile terminal implementing a dynamic and visual search interface including search criterion areas according to another example embodiment of the present invention;

FIG. 20 is an illustration of a mobile terminal implementing a dynamic and visual search interface including search criterion areas according to yet another example embodiment of the present invention;

FIG. 21 is an illustration of a mobile terminal implementing a dynamic and visual search interface including search criterion areas according to another example embodiment of the present invention;

FIG. 22 is an illustration of a mobile terminal implementing a dynamic and visual search interface including search criterion areas and an animated search path according to another example embodiment of the present invention; and FIG. 23 is flowchart of a method for providing a dynamic and visual object search interface according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth® interfaces. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals, such as the mobile terminal 10 and the second mobile terminal 20, may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computer, laptop computer, tablet computers, mobile computers, cameras, video recorders, audio/video players, positioning devices, game devices, television devices, radio devices, or various other devices or combinations thereof.

Although the mobile terminal 10 may be configured in various manners, one example of a mobile terminal that could benefit from an example embodiment of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops, tablets, or mobile computers), cameras, audio/video players, radios, global positioning system (GPS) devices, or any combination of the aforementioned, and other types of communication devices, may employ an example embodiment of the present invention. As described, the mobile terminal may include various means for performing one or more functions in accordance with an example embodiment of the present invention, including those more particularly shown and described herein. It should be understood, however, that a mobile terminal may include alternative means for performing one or more like functions, without departing from the spirit and scope of the present invention.

The mobile terminal 10 illustrated in FIG. 2 may include an antenna 32 (or multiple antennas) in operable communication with a transmitter 34 and a receiver 36 for providing a communications interface. The mobile terminal may further include an apparatus, such as a processor 40, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM (Global System for Mobile communications) and IS-95, or with third-generation (3G) wireless communication protocols, such as UMTS (Universal Mobile Telecommunications System), CDMA2000 (Code Division Multiple Access), wideband CDMA (WCDMA) and time division-synchronous CDMA (TD-SCDMA), with 3.9G wireless communication protocols such as E-UTRAN (evolved-UMTS (Universal Mobile Telecommunications System) terrestrial radio access network), with fourth-generation (4G) wireless communication protocols or the like.

It is understood that the apparatus, such as the processor 40, may include circuitry implementing, among others, audio and logic functions of the mobile terminal 10. The processor 40 may be embodied in a number of different ways. For example, the processor 40 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 40 may include one or more processing cores configured to perform independently. A multi-core processor may enable multiprocessing within a single physical package. Additionally or alternatively, the processor 40 may include one or more processors configured in tandem via the bus to enable independent execution of instructions, pipelining and/or multithreading.

In an example embodiment, the processor 40 may be configured to execute instructions stored in the memory device 62 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal or network device) adapted for employing embodiments of the present invention by further configuration of the processor 40 by instructions for performing the algorithms and/or operations described herein. The processor 40 may include, among other things, a clock, an arithmetic logic unit (ALU) and logic gates configured to support operation of the processor 40.

At least some components of the mobile terminal 10 including the processor 40 and, in some embodiments, a memory device, such as volatile memory 60, may be embodied as a chip or chipset. In other words, processor 40 and optionally an associated memory device may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processor 40 and optionally an associated memory device may therefore, in some cases, be configured to implement an embodiment of the present invention on a single chip or as a single "system on a chip." As such, in some cases, a chip or chipset may constitute means for performing one or more operations for providing the functionalities described herein.

The mobile terminal 10 may also comprise a user interface including an output device such as an earphone or speaker 44, a ringer 42, a microphone 46, a display 48, and a user input interface, which may be coupled to the processor 40. The mobile terminal 10 may further include sensor(s) 47 for detecting a stimulus such as a button for detecting a depression, a touch sensitive display for detecting a touch, or a motion sensor to detect motion. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, e.g., cell id identity or cell id information, with which the mobile terminal is in communication. As the memories, and in particular a UIM 58 that may include a memory, may contain sensitive or personal information, the UIM 58 may be password protected to preclude an unauthorized user from using the mobile terminal 10.

Example embodiments of the present invention may provide a mechanism by which a user may search for an object within a search target using a dynamic graphical interface to identify a search target, select search criteria, and adjust the weight afforded each individual search criterion. While the invention described herein is disclosed primarily with reference to mobile terminals, embodiments of the present invention may be suitable for use on any device that may provide a graphical user interface and function in communication with a memory that may store objects or a network which may contain objects and information which are the subject of a search. As such, the present invention is not limited to mobile terminals and may be implemented on a variety of different types of devices. Further, while example embodiments of the present invention are herein described with respect to a dynamic search interface presented on a mobile terminal, the dynamic search interface may be provided by an intermediate visual search service, accessed by a mobile terminal. The intermediate visual search service may provide the search functionality for a client (e.g., a mobile terminal) and receive search criteria from the client to then perform the search on a search target as specified by the client.

Objects which may be the subject of a search may include files such as multimedia files (e.g., videos, pictures, audio files, etc.), office files (e.g., spreadsheets, text files, Word®, PowerPoint®, Excel®, Visio®, etc.), data files, applications, programs, driver files, etc. Objects may also include contacts in an address book, classified advertisements (e.g., automotive, personal/dating, real estate, items for sale, etc.), web pages, or any such information for which a user may search.

Mobile terminals may be capable of storing many gigabytes of objects such as files and data such that searching for a particular object may be made considerably more difficult by the volume of objects stored within a memory of the device and the user not knowing an exact name of the object for which they are looking. Additionally, mobile terminals may be capable of searching for objects that are stored remotely, such as on a network server or otherwise accessible to the mobile terminal through a communications interface exponentially expanding the amount of objects analyzed by a search. The search may be made particularly arduous when a user is not entirely sure of what they are searching for or how concise their search target is such that defining precise search criteria may not be possible.

In an example embodiment, objects stored on a memory of a device, such as memory 62 of mobile terminal 10, may include various types of files and information as outlined above. Each of these types of files may include different information that is searchable by a search mechanism. For example, a text file may permit searching of the text within the file for a particular word whereas an application file, while possibly containing words within the data of the file, may not be configured to be searched for text. Consequently, each type of file may allow different types of search parameters to be used to determine the relevance of each respective file relative to the search. A user, when searching for a file, may not necessarily know what type of file they are searching for such that some search parameters used may not be relevant to some of the files identified within the search. Various search parameters may be available to a user from very basic search parameters to very specific search parameters. Similarly, objects stored remotely from a device, such as on a network server of network 30 may be accessible to a mobile terminal 10 via a communications interface (e.g., transmitter 34 and receiver 36) and may be searched by methods presented herein.

Search parameters may include a file name, a text string, a date created, a date modified, a file type, an object location (e.g., a physical, geographic location), etc. Some example search parameters are listed below in Table 1. Table 1 is not intended to be an exhaustive list of possible search parameters, but to provide example embodiments of search parameters that may be used within example embodiments of the present invention. Each search parameter may be searched by search criteria. The search parameter defines how the search criteria is used. For example, a keyword may be a search criterion for the "text" search parameter. Thus, the search criterion is what is searched while the search parameter identifies the rules of how the search criterion is applied. A search for the search criterion keyword "default" in the "Name" search parameter may limit the search for the word "default" only to object names.

Optionally, multiple criteria may be used, each with the same search parameter, such as two separate keywords searched within the "text" search parameter. Thus, a search of the text of objects within a search target would look for both keywords. A keyword may be a single word; however, a keyword may also be a text string of words or characters and spaces as used in a single search parameter. Optionally, multiple parameters can be used such as a keyword criterion in the "text" search parameter and a date criterion within the "date" parameter. Further, search criteria may be generic without an associated parameter such that a search may look for the criterion in any available field.

TABLE 1

| Parameter | Description |
|---|---|
| Text | Search may look for text string anywhere in file name, contents, metadata, etc. |
| Name | Search may look for an object name, such as a file name |
| Date | Search may look for objects created or modified on or around a specified date or date range |
| Size | Search may look for objects of a certain size, within a certain size range, or above or below a size threshold |
| Type | Search may look for objects of a certain file type or related to a certain file type |
| Author | Search may look for an object with a particular author or creator |
| Artist | Search may look for an object with an associated |

TABLE 1-continued

| Parameter | Description |
|---|---|
| | artist, such as in a music file |
| Album | Search may look for an object with an associated album title, such as in a music file |

An example embodiment of the present invention may include a search wherein a user defines at least two search criteria for inclusion in a "search string." A search string may be a text representation of the search to be conducted as will be further detailed below. The search criteria may be of the same search parameter, of different search parameters, or generic without parameter limitation. FIG. 3 depicts an example embodiment in which two keyword search criteria are used. The illustrated embodiment depicts a mobile terminal 300 with a display 310. The display shows a search target 320 which may be selected by a user as the search target of the search (e.g., the bounds within which the search will be conducted). The search target 320 may be a single folder within a memory, a group of folders, an entire memory, such as a memory card or hard drive, or any location within a memory. Further, the search target may be within an application, such as an email application or music application where the search may be limited to files relevant to that particular application. In such an embodiment, the search target 320 may be an email correspondence folder or a music genre folder. Further still, the search target may include network entities or the Internet such that the search is not bound to search only locally within the mobile terminal 300, but may search for remotely stored objects. The search target may include a particular website (e.g., YouTube®, Amazon®, eBay®, etc.), group of websites (e.g., on-line shopping websites, travel websites, etc.), internet-based or network-based application, third-party search engines (e.g., Google®, Bing®, Yahoo®, etc.), or define the bounds of a search by any available means.

The example embodiment FIG. 3 further illustrates two search criteria: Keyword (1) 330 and Keyword (2) 340 presented on the display 310. The keywords 330, 340 may be criteria for any compatible search parameter, such as text, author, etc. Keyword (1) 330 and Keyword (2) 340 may be presented on the display 310 proximate the search target 320. Optionally, links 335 and 345 may be displayed between the keywords 330, 340 respectively, and the search target 320 to visually illustrate the distances and links between the keywords 330, 340 and the search target 320. Upon receiving the search target 320, Keyword (1) 330, and Keyword (2) 340, a search for an object within the search target 320 may be performed to find the objects most relevant to the search criteria selected within the search target. The search string represented by the embodiment of FIG. 3 may be represented by: (Keyword (1) AND Keyword (2)) IN (Folder). Thus, the search is looking for occurrences of Keyword (1) AND Keyword (2) within the Folder.

The distance between the search target 320 and the search criteria 330, 340, may correspond to the weight afforded each search criteria. In the illustrated embodiment, the distances from Keyword (1) 330 to the search target 320 and Keyword (2) 340 and the search target 320 are equal, such that each of the search criteria, namely Keyword (1) 330 and Keyword (2) 340, are afforded the same weight in the search. The "weight" is the precedence given to a search criterion. For example, an object which contains exactly one occurrence of Keyword (1) and no occurrences of Keyword (2) would have the same relevancy to the search as an object which contains exactly one occurrence of Keyword (2) and no occurrences of Keyword (1). Thus, no precedence is afforded either search criterion when the weights are the same. With the inclusion of weights, and in the instant embodiment, equal weights to both Keyword (1) and Keyword (2), the search string may be represented by: Keyword (1)*50% AND Keyword (2)*50%, thus illustrating an equal contribution to the search from both search criteria.

The search results 350 may be presented on the display 310 as the search is updated such that any changes to a search criterion or the weight of a search criterion causes the search results 350 to be updated accordingly. Thus a user can see the results of a search dynamically as the search criteria are changed, allowing the user to adjust the search as they see fit. The search results 350 may be presented in an order suggesting the relevance of the search results found. For example, the most relevant search results may be an object presented more prominently, or in a location that suggests the relevance of each object found. The most relevant object may be given more visual weight, a more prominent location on the display, or the most relevant object may be positioned at the top of a list of the search results, with the search results arranged in order of most relevant to least relevant. The visual weight afforded the search results may be in the form of transparency, size, color, or any other mechanism by which an object may be made more prominent relative to less relevant search results. The relevance may be determined by the frequency with which a search criterion is found within an object or how closely a searched criterion of a parameter matches a parameter of the object. Each searched criteria may contribute to the relevance of an object and that relevance may be represented by a relevancy score. For example, if an object is searched for a file name including the keyword "document" and the creation date of that object falls within a date range set by a user as a search criterion, if a file meets both of those requirements, a relevance score of 100% may be achieved. If the date created falls outside of a range specified by a user, the relevance score may decrease accordingly.

FIG. 4 illustrates the example embodiment of FIG. 3; however, the search criterion Keyword (2) 340 has been moved closer to the search target 320. The search criterion Keyword (2) 340 may be moved by a user through a touch-screen interface where the user touches/drags Keyword (2) 340 or through the use of a cursor, pointing device, keyboard, or any other user interface. The distance between Keyword (1) 330 and the search target 320 is greater than the distance between Keyword (2) 340 and the search target 320. In response to Keyword (2) 340 being moved closer to the search target 320, the search criterion Keyword (2) 340 is afforded a higher or greater weight for the search. A revised search of the search target 320 may then be performed in response to the search criterion Keyword (2) 340 being moved relative to the search target 320. The weight afforded Keyword (2) 340 may be inversely proportional to the distance between the search target 320 and the search criterion Keyword (2) 340. For example, if Keyword (1) 330 is 20 millimeters from the search target 320 and Keyword (2) 340 is 5 millimeters from the search target 320, Keyword (2) may be given four times the weight of Keyword (1) as Keyword (1) 330 is four times the distance from the search target 320 as keyword (2) 340. Thus, the example embodiment of FIG. 4 may be represented by the search string: Keyword (1)*20% AND Keyword (2)*80%, such that Keyword (2) is afforded a correspondingly higher weight when determining the relevance of the objects found.

Example embodiments of the present invention may include various methods for calculating the weight afforded any particular search criterion. For example, when two search criteria exist, the weight afforded each may be inversely proportional to the distance between the search target and each of the search criterion. When a third or subsequent search criterion is added, the weight afforded the additional criterion may correspond to the distance between the third search criterion and the search target relative to the other search criteria present. FIG. 5 illustrates an example embodiment in which three search criteria have been entered. Keyword (1) 360, Author 370, and Keyword (2) 380 are each search criteria for finding an object within search target 320. As the author 370 search criterion is the closest to the search target 320, the Author 370 is afforded the greatest weight. Keyword (2) 380 may be afforded the second highest weight as it is the next closest search criterion, while Keyword (1) 360 is afforded the lowest weight as it is the furthest from the search target 320. The weight afforded each criterion may be calculated as a proportion of the total distance between each criterion and the search target. For example, if the distance from the Author 370 to the search target 320 is 20 millimeters, the distance from Keyword (2) 380 to the search target is 30 millimeters, and the distance from Keyword (1) 360 to the search target is 50 millimeters, the weight may be calculated as follows:

Total distance of all search criteria from the search target: 20 mm+30 mm+50 mm=100 mm.
The weight afforded Author 370=100 mm/20 mm=5;
The weight afforded Keyword (2) 380=100 mm/30 mm=3.3;
The weight afforded Keyword (1) 360=100 mm/50 mm=2.

The weight may then be taken as a proportion of the total, such that Author 370 may be afforded a weight approximately 50%, while the weight afforded Keyword (2) may be approximately 30%, while the weight afforded Keyword (1) may be approximately 20%. Moving any of the search criteria may cause the relative weights of each individual search criterion to be recalculated based upon the new location of each of the search criteria relative to the search target. Optionally, as illustrated in FIG. 5, an indication of the weight of each search criteria in the form of a list of criteria 390 may be displayed for quick reference by a user. The list of criteria may be re-ordered based upon the weight of each criterion as the weights are changed by a user changing the relative locations of each search criterion.

FIG. 6 illustrates a further embodiment of the present invention wherein the search criteria are included in a search with Boolean search terms. While search criteria may typically be used in a search in an additive form (e.g., the search contains A, B, AND C), searches may also include Boolean operators that enhance the search capabilities to include terms such as "OR" and "NOT". In the illustrated embodiment of FIG. 6, the search includes two search criteria Keyword (1) 330 and Keyword (2) 340. The links between each keyword and the search target 320 further include Boolean operator indicators 337 and 347. The Boolean operator indicators indicate how the search criterion is applied to the search of the search target 320. The search of the illustrated embodiment may look for objects that include Keyword (1) 330 based upon the "AND" 337 operator while the search excludes objects that include Keyword (2) 340 based upon the "NOT" 347 operator. The search string illustrated by the embodiment of FIG. 6 may be represented by: (Keyword (1)*50%) NOT (Keyword (2)*50%).

While the above example embodiments have been described with regard to search criteria that may be moved relative to a search target, the search target may be moved relative to the search criteria. For example, in the illustrated embodiment of FIG. 3, the search target 320 displayed between Keyword (1) 330 and Keyword (2) 340 may be moved such that it is closer to one keyword than the other, thereby increasing the weight afforded the keyword to which the search target was moved closer while reducing the weight afforded the keyword away from which the search target was moved.

FIG. 7 illustrates an example embodiment wherein the search target 420 may be moved relative to the search criteria to effect a change in the search results 450. A user may wish to search for an object of a particular name; however, the user may not know the specific search target in which the object may be located. The user may then enter search criteria such as Keyword (1) 430 and Keyword (2) 440. A search target 420 may be selected and the results 450 displayed from the search of the search target 420. If a user wants to change the search target 420 to search in a different location, the user may scroll through different search targets, such as another folder 422 or to a network server, or to the Internet. Arrows 424 and 426 may allow a user to scroll beyond the search targets 420, 422 depicted on the display to search targets available, but not visible. In response to the user scrolling, the first search target 420 is moved from between Keyword (1) 430 and Keyword (2) 440 and replaced with another search target, such as search target 422. The search results 450 may then be updated to illustrate the search results of the search criteria when searched within the new search target 422. The search targets may be presented in a continuous chain through which a user may scroll to find the search target desired. The search target chain may include various levels of a folder hierarchy or the target chain may include only main folders within a memory. Optionally, a user may select a search target, either by a tap or other user selection using a user interface, to select a sub-set of the search target, such as a folder within a main folder, in an effort to reduce the number of objects within a search target or to perform a more targeted search.

As noted above, the search targets 420, 422 or chain of search targets may be moved relative to the search criteria (e.g., Keyword (1) 430 and Keyword (2) 440) to alter the weight afforded each of the respective search criteria.

While the aforementioned embodiments have been described with search criteria comprising keywords or other parameters, example embodiments may further include search criteria that include objects (e.g., multimedia files, office files, applications, etc. as described above). FIG. 8 illustrates a search performed on a mobile terminal 500 with a display 510. The search includes a search target 520, a first search criterion 530, and a second search criterion 540. In the illustrated embodiment, the first search criterion 530 is the word "black" while the second search criterion is a multimedia file, specifically an image file of a picture of a cat. The search may use the search criterion 530 of "black" as a keyword in a selected search parameter (e.g., file name) or the search criterion 530 of "black" may be a keyword incorporated into the search generally, unassociated with a specific parameter. The search criterion 540 of the image file may similarly be specified to be a search criterion for a particular parameter which is a property of the image file (e.g., a file type, a file size, a date created, etc.) or the search criterion 540 of the image file may generally search for objects with similar properties or metadata, thereby including all information or metadata associated with the image file in the search string. The metadata of the image file may include such information as the file type (e.g., a format such as graphics interchange format (.gif), a joint photographic experts group format (jpeg), a bitmap format (.bmp), etc.), a file size, a date of creation, a date of modification, a source location, a geographic identifier, etc. The search may use some or all of the metadata information of the second search criterion 540 to compare with other objects within the search target 520 in order to find the objects most relevant to the search criteria 530 and 540.

As previously outlined, the distance between the search target 520 and the search criteria 530 and 540 may define the weight afforded each of the search criterion. In the illustrated embodiment of FIG. 8, the first search criterion 530 of the keyword "black" is afforded a 25% weight while the second search criterion 540 of the image file of a picture of a cat is afforded a 75% weight. The weight afforded each of the search criteria may be displayed in a graphic format to clarify to a user the weight that has been afforded each of the search criteria. In the instant embodiment, a numerical depiction of the weight 532, 542 is used to illustrate the weights. The search results 550 are presented on the display 510. As shown, an image of a black cat is displayed on the left side of the search results, indicating the most relevant object found within the search target 520. Images of cats of colors other than black are displayed adjacent to the image of the black cat indicating that they are the next most relevant objects found within the search target 520. As the first search criterion 530 of the keyword "black" was afforded a lower weight of 25%, the search results including an image of a cat that is not black may be more relevant. Should the first search criterion 530 be afforded a higher weight, the images of the cats of colors other than black may become less relevant to the search and may disappear from the search results 550.

FIGS. 9-14 illustrate further example embodiments of the present invention in which a search target 620 may be moved among search criteria to change the weight afforded each of the search criterion on the results of the search. In the illustrated embodiments, keywords are selected as the search criteria; however, any search criteria may be used in the same manner. Keyword A, Keyword B, and Keyword C are each selected as search criteria and the search criteria are arranged on a display 610. The locations selected for the each of the search criteria may be user selected and each of the search criterion may be repositionable on the display, or removed from the display, in response to a user moving or directing movement of the search criteria. Links 630 between the search criteria may be user-defined (e.g., drawn or selected by a user) or the links may be generated in response to the search criteria being presented on the display (e.g., a link may be formed between each search criterion as it is added or created). A search target 620 may be selected and positioned on the display 610 between the search criteria by a user. The user may move the search target 620 along the links 630 to vary the weight afforded each of the search criterion. For example, in FIG. 9, the search target 620 is located proximate the Keyword A search criterion, along the link 630 between Keyword A and Keyword B, but not on the link between Keyword A and Keyword C. The resultant search may include both Keyword A and Keyword B, with Keyword A being afforded a greater weight as the search target 620 is considerably closer to the search criterion Keyword A than it is to Keyword B. As the search target 620 is not placed on the link between Keyword A and Keyword C, the search criterion Keyword C may be afforded zero weight for the instant search. A graphic depiction of the weights afforded each of the search criteria may be displayed as shown at 640. The graphic depiction of the weights afforded may be in a graphical, numerical, or other format that conveys the weight of each search criterion used to a user.

FIG. 10 illustrates the example embodiment of FIG. 9 with the search target 620 moved to be located mid-way between the Keyword A and Keyword B search criteria. As illustrated by the graphic depiction of the weights afforded 640, each of Keyword A and Keyword B are afforded a 50% weight in the search. FIG. 11 illustrates the example embodiments of FIGS. 9 and 10 with the search target 620 re-sized and re-located within the display 610 to alter the search. The search target 620 may be re-sized by a user in order to generate the search that is desired by the user. Enlarging or reducing the size of the search target 620 may allow a user to more precisely locate the search target 620 relative to the search criteria presented on the display 610. In the instant embodiment of FIG. 11, the search target 620 may be enlarged to better overlay the links between Keyword A and Keyword B and Keyword A and Keyword C, thus incorporating all three search criteria into the search. As the search target 620 is arranged substantially equidistant from each of the three search criteria, each search criterion may be afforded the same weight as demonstrated by the graphic depiction of the weights 640. Of note, the weights may be rounded for purposes of illustration to a user; however, the rounding of the weights may still result in a graphic depiction that is easily understood by a user.

Example embodiments may further allow a user to move both the search target 620 and the search criteria as illustrated in FIG. 12 which illustrates the example embodiment of FIG. 9 with both the search target 620 and Keyword C moved relative to their original positions of FIG. 9. The movement of either the search target 620 or the search criteria may effect a change in the search by altering the weight afforded one or more of the search criteria. In the example embodiment of FIG. 12 relative to the embodiment of FIG. 9, the search target 620 has been moved to overlay the link between Keyword A and Keyword B and the link between Keyword A and Keyword C. Further, Keyword C has been moved relative to the location of FIG. 9 further distancing Keyword C from the search target 620. The result of the movements from FIG. 9 to FIG. 11 include adding Keyword C to the search criteria used and re-evaluating the weight afforded to each of the search criterion. In the illustrated embodiment, the search target 620 is midway between Keyword A and Keyword B, affording each the same weight, while Keyword C is a greater distance away from the search target 620 than either of Keyword A or Keyword B, such that Keyword C is afforded a lower weight, as indicated by the graphic depiction of the weights 640.

FIG. 13 illustrates an example embodiment similar to those depicted in FIGS. 9-12; however, the search string used to define the search may include additional Boolean operators, such as OR and NOT. In the illustrated embodiment, Boolean operators have been added to the search criterion to further define and enhance the searching capabilities. Keyword B has been associated with the search with a Boolean operator of "OR" 650 while Keyword C has been associated with the search with a Boolean operator of "NOT" 660. Thus the search string may be represented by: (Keyword A*40%) OR (Keyword B*40%) NOT (Keyword C*20%). The graphical depiction of the weights 640 may optionally include an illustration of how each of the search criteria is included in the search string by illustrating the Boolean operator as shown.

FIG. 14 illustrates another example embodiment in which Boolean operators may be used to enhance the search capabilities. A representative search string of the search illustrated in FIG. 14 may be: (Keyword A*50%) AND ((Keyword B*25%) OR (Keyword C*25%)). In such an embodiment, an object with one occurrence of Keyword A and one occurrence of Keyword B would be equally as relevant to the search as an object with one occurrence of Keyword A and one occurrence of Keyword C.

Example embodiments of the present invention have been described with regard to a two-dimensional representation of a search including a search target and search criteria; however, embodiments may include a search space that is in three-dimensions (3D) or other multi-dimensional search space. Such a 3D search space may be embodied on a two-dimensional display with the third dimension added virtually by the perspective and overlapping of objects, search criteria, and search targets displayed. 3D embodiments of a search space may also be implemented on a device that includes a two-sided display (e.g., on the front and back of a device), or on a device where the entire surface is an active display as in a volumetric display. In such embodiments, the search criteria can be on different sides of the device, but nevertheless, their distance to the file folder icon may be calculated by the interface to determine the weight afforded each of the search criterion. FIG. 15 illustrates an example embodiment of a display having a front 710 and back 720 side. Keyword (1) is depicted on the front display 710 while Keyword (2) is depicted at or on the back display 720, with a search target 730 depicted between the two. As illustrated in the top view of the display 740, Keyword (1) and Keyword (2) are substantially equidistant from the search target such that each of the search criteria are afforded equal weight. Movement of either of the criteria (Keyword (1) or Keyword (2)) or the search target 730 relative to one another within the 3D space (or virtual 3D space as the case may be) may change the distances between each of the search criterion and the search target 730, thereby changing the weight afforded each of the search criterion in the search string.

Further example embodiments of the present invention may be used for searching for objects over a network, such as information regarding a product or classified advertisements on the Internet. FIG. 16 illustrates an example embodiment of a search for a car, such as through a classified ad, an online marketplace, or similar resource. The search target 820 may be a car on the Internet. While the search target 820 location may be the Internet, the search term "car" may be a required search criterion that is used to limit the bounds of the search. As such, the term "car" is displayed in the search target 820 icon. Therefore, the bounds of the search are cars on the Internet in the illustrated embodiment. Search criteria may be added to the search to reduce the number of results. Search criteria may be added within search parameters, such as "red" may be searched in the parameter of "color" of the car. Optionally, the keyword "red" may be used as a search criterion without binding the term to the "color" parameter, which may increase the number of results such as including cars with red interiors, regardless of exterior color. The search criteria in the illustrated embodiment are each associated with a search parameter. The first search criterion 830 includes the keyword "red" in the parameter "color," the second search criterion 840 includes the range of "1920-1975" in the parameter "year," and the third search criterion 850 includes the range of "10,000-30,000" in the parameter "price." Each of the search criterion are arranged at a distance from the search target 820 that corresponds to the weight afforded each of the search criterion. A graphical depiction of the weight of each criterion may be displayed as shown at 860. The search results 870 may be displayed in the order of relevance based upon the search string. Moving the search criteria or the search target 820 relative to one another may alter the weight afforded each of the search criteria as outlined above, and therefore may change the relevance of the search results.

As illustrated in FIG. 16, a search criterion of "CAR" has been included in the search target 820. A search criterion included within the search target 820 may be considered a "must-have" search criterion or an absolute search criterion, without which, objects will not be considered. Optionally, a search criterion may be made absolute (e.g., required of any objects found in the results) by moving the search criterion onto, or overlapping with, the search target 820. Absolute search criterion may not appear in a graphic depiction of the weight 860 of search criteria as it would be known to be absolute and required of all search results.

FIG. 17 illustrates a further example embodiment similar to that described with respect to FIG. 16; however, the search target 820 includes a range of search targets 820 that may include absolute search criteria for a search. For example, the search of FIG. 16 is for a car on the Internet. Once the broad search for a car is established, different categories of cars may appear as optional search targets 820 which may be used to further refine the search results. In the illustrated embodiment, the optional search targets include "convertible" type cars, "sports" type cars, "vans", etc. as absolute search criterion within a search target 820 with arrows 822 indicating that additional search targets available.

Example embodiments of the present invention may include a dynamic and visual object search interface using search criteria embodied as areas of a display in which a search target is located to determine the weight afforded each of the active search criteria. FIG. 18 illustrates an example embodiment in which a mobile terminal 1000 including a display 1010 depicts a first search criterion area 1020 and a second search criterion area 1030, each embodied as an area shown on the display 1010. The search criteria areas 1020 and 1030 are shown as areas which overlap one another in a central, overlapping area 1025. The search criterion areas 1020, 1030, may be sized and shaped according to pre-defined shapes and sizes or they may be user defined. A user may select the number of search criteria and an area may be generated for each search criterion selected. The user may also select what search criteria are used for each search criteria area. The search criteria used for each search area may be selected as outlined above, optionally including search parameters. Further, a search criterion area may include multiple search criteria and parameters such as multiple keywords, authorship, creation date, etc. In the illustrated embodiment, the first search criterion area 1020 includes search criterion "Keyword (1)" while the second search criterion area 1030 includes search criterion "Keyword (2)." The search criteria may or may not be displayed in the search criterion areas as illustrated. A search target 1040 may be depicted on the display 1010 where the search target 1040 defines the bounds of the search, or where the search is to be conducted. In the illustrated embodiment, an icon of a globe is illustrated as the search target 1040, possibly illustrating that the bounds of the search are the internet or world-wide web. The location of the search target 1040 within the search criteria areas 1020 and 1030 may dictate the weight afforded each of the search criterion. As overlapping area 1025 is within both search criteria areas 1020, 1030, both search criteria are afforded some weight in the search. Conversely, if the search target 1040 were situated at the point identified by arrow 1027, outside of the second search criterion area 1030, the second search criterion "Keyword (2)" would be afforded no weight in the search string.

As noted above, the location of the search target 1040 relative to the search criteria areas 1020 and 1030 may dictate the weight afforded each of the search criteria. The weight may be determined in a number of ways, including the proximity of the search target 1040 to the edge of an area 1020 (e.g., the closer to the edge of the area, the lower the weight afforded the criteria) or the weight may be determined based upon a distance from a particular point, or anchor point, within the area, such as a center point. Further, the weight may be determined based upon the relative position of the search target 1040 within an area 1020. For example, if the search target 1040 is within one centimeter of an edge of a first criterion area and within two centimeters of an edge of a second criterion area, the search criterion of the second search criterion area may be afforded twice the weight of the search criterion of the first search criterion area as the search target 1040 is determined to be more within the second search criterion area than the first search criterion area. In such an example embodiment, the absolute distance to the edge of a search criterion area may not be relevant, but rather the relative distance to the edge of a search criterion area as compared with the distance to the edge of all other search criterion areas included in the search. In one example, if the search target 1040 was situated within a first search criterion area, but outside of all other search criterion areas, the search criterion associated with the first search criterion area may be afforded a weight of 100%, regardless of the location of the search target within the first search criterion area.

FIG. 19 depicts another example embodiment in which a mobile terminal 1100 presents a first search criterion area 1120 and a second search criterion area 1130 on a display 1110. The first search criterion area 1120 is associated with the search criterion keyword "Recipes" while the second search criterion area 1130 is an image depicting a cow, indicative of a search criterion related to cows. While locating the search target 1140 in only the first search criterion area (rather than in an overlapping area 1125) may provide search results including recipes without regard to any specificity, locating the search target 1140 in the overlapping area 1125 may provide search results including recipes for preparing beef (e.g. a search pertaining to both recipes and cows). FIG. 20 illustrates a further example embodiment in which a third search criterion area 1150 is associated with a third search criterion identified as the keyword "BBQ." Locating the search target 1140 within the area overlapping between all three search criterion areas may provide search results of recipes for cooking beef in a barbeque style. Conversely, locating the search target 1140 within the area identified by 1155 which is within the search criterion area 1120 pertaining to keyword "Recipes" and search criterion area 1150 pertaining to keyword "BBQ," the search results may produce barbeque style recipes without regard for whether beef is included in the recipe.

FIG. 21 illustrates an example embodiment of the present invention in which four search criterion areas are depicted on the display 1210 of a mobile terminal 1200. A first search criterion area 1220 corresponds to "Keyword (1)," a second search criterion area 1230 corresponds to "Keyword (2)," a third search criterion area 1240 corresponds to "Keyword (3)," and a fourth search criterion area 1250 corresponds to "Keyword (4)." In the illustrated embodiment, a search target located in the position marked "A", which is equidistant between all of the search criterion areas, would result in a search string wherein each of the search criteria are afforded an equal weight of 25%. The visual indication of the weight afforded the keywords for a search target located at position "A" is illustrated at 1260. A search target located at position "B", equidistant between the third search criterion area 1240 and the second search criterion area 1250, while outside of the first search criterion area 1220 and second search criterion area 1230, may afford a 50% weight to "Keyword (3)" and a 50% weight to "Keyword (4)" while affording zero weight to "Keyword (1)" and "Keyword (2)." A search target located in position "C" may afford "Keyword (2)" a weight of 100% while affording the remaining keywords zero weight. As noted above, the weight may be determined based on the location within the search criterion areas in view of the distance from an anchor point, the distance to the edge of each search criterion area, or relative distance between search criterion areas.

Search criteria may also be embodied as dynamically changing search criteria, such as criteria that trends or changes over time. For example, a search criterion may be embodied as the most popular news story on a news website. The search criteria may be depicted on a display as a "search widget" which may be represented by an icon, such as the logo of the news website. If the search criteria is tied to the most popular story (which may be updated in real-time or on a periodic basis), the search criteria may provide a subject, keyword, person, or other item of information related to the most popular story as the search criteria in the search string. For example, if the most popular story at a particular moment in time is "Flying Cows Spotted," the search widget may use "Flying" and/or "Cows" as keyword search terms in the search string using the search widget. Similarly, a search widget may be associated with a social networking application and the search criteria may be associated with the most recent status update received or posted by a particular user or acquaintance. In such an embodiment, the search widget may use keywords from the most recent status as keywords in the search criteria for a search string using the search widget. In such embodiments, the search widget may provide a search criteria that is routinely updated and is variable based upon the target with which the search widget is associated. Further embodiments of search widget targets beyond news stories or social networking statuses may include music charts wherein a search widget associated with a music chart (e.g., the Billboard® top 100) may use the artist, song title, and album of the top rated song as search keywords. As the music chart is updated, the keywords associated with the widget may be updated accordingly.

As previously described, the location of the search target, or the location of the search criteria relative to the search target, may be changed by a user by dragging or otherwise moving either the search target relative to the search criteria or the search criteria relative to the search target using any available input means. An example embodiment is herein described with regard to a search target being moved relative to the search criteria which are embodied as search criteria areas as shown in FIG. 22. The search criteria areas 1220, 1230, 1240, and 1250 may each be associated with a respective keyword or other search criteria (e.g., search widgets, pictures, etc.). The search string, and consequently, the search results, may be updated periodically as the search target 1270 is moved between or within the search criteria areas. The periodic updating of the search string may be virtually real-time (e.g., updated every one millisecond or possibly faster) or the periodic updates may be at greater intervals, such as once every second. The period for updates may be user adjustable and a longer period between updates may be desirable for reduced power consumption and/or a reduction in bandwidth required. As the search string is updated, the weight afforded different search criteria may change and the search results may be updated accordingly. In such an embodiment, a user may see the results change as they move the search target 1270. In the illustrated embodiment, the search results are depicted on the display 1210 at 1280 and the search results may change as the search target 1270 is moved between search criteria areas 1220-1250.

Further example embodiments of the present invention may include an animated search path which allows a user to view search results as a search target is moved relative to the search criteria areas. While described with respect to moving a search target between or within search criteria areas, example embodiments of an animated search path may be used with any of the embodiments outlined above as will be appreciated by one of ordinary skill in the art. FIG. 22 depicts a search target 1270 located in search criteria area 1220, where the search criteria "Keyword (1)" may be afforded a weight of 100%. A user may define a path 1290 comprising multiple locations within other search criteria areas, such as location "A", location "B," and location "C." Optionally, the user may then select a time or duration for the animation of the search path. A user may then initiate an animation where the search target moves autonomously through the points previously selected by the user (e.g., points A, B, and C) and the animation may last the selected duration. Upon animating the search path, the search results may dynamically change as the search target 1270 is moved along the path created by the multiple locations selected by the user, and the user may view the changing search results as the animation progresses from the initial starting point of the search target 1270, to point "A," to point "B," to point "C." The user may select any of the search results at any point during the animation or may bookmark or save a search result during the animation for future retrieval. Additionally, the search results found through the duration of the animation may be compared against one another in an effort to determine the most relevant search results from each of the search strings used during the searches along the animated path. The search results 1280 may then depict the most relevant results encountered during the multiple searches conducted during the animated search path. Although not illustrated in FIG. 22, search results 1280 may be presented as visual icons along search path 1290.

An example embodiment of a mechanism for performing an example embodiment of the present invention is presented in the flowchart of FIG. 23. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIG. 23, described further below, may comprise a processor (e.g., the processor 40) configured to perform some or each of the operations (900-940) described below. The processor may, for example, be configured to perform the operations (900-940) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 900-940 may comprise, for example, the processor 40 and/or a device or circuit for executing instructions or executing an algorithm for processing information as described further below.

FIG. 23 depicts an example embodiment of the present invention showing a flowchart of operations that may be performed on a device (e.g., mobile terminal 10) where the operations may be performed by a processor (e.g. processor 40). A search target may be displayed at operation 900. A first search criterion may be displayed at 910 while a second search criterion may be displayed at 920. The distance between the first search criterion and the search target may correspond to a first search criterion weight. The distance between the second search criterion and the search target may correspond to a second search criterion weight. A search may be performed within the search target using the first search criterion afforded the first search criterion weight and using the second search criterion afforded the second search criterion weight at 930.

Additional operations may be performed independently or in cooperation with the operations 900-940. The optional operations, depicted in broken lines in FIG. 23, may include receiving an indication to move the first search criterion at 940 and providing for a revised search based upon the first search criterion moving at 950.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the tangible, non-transitory storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and associated drawings describe example embodiments in the context of certain example combinations of elements and/or functions, it should be appreciated that different combinations of elements and/or functions may be provided by alternative embodiments without departing from the spirit and scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   providing for display of a first search target;
   providing for display of a first search criterion disposed at a first distance from the first search target, wherein the first distance corresponds to a first search criterion weight;
   providing for display of a second search criterion disposed at a second distance from the first search target, wherein the second distance corresponds to a second search criterion weight;
   searching, by a processor, a first location comprising the bounds within which the search is conducted as represented by the first search target using the first search criterion afforded the first search criterion weight and the second search criterion afforded the second search criterion weight;
   changing a position of the first search target, while the first search criterion and the second search criterion remain stationary, where in response to changing the position of the first search target, the first search criterion is disposed at a third distance from the first search target and the third distance corresponds to a new first search criterion weight, wherein the second search criterion is disposed at a fourth distance from the first search target and the fourth distance corresponds to a new second search criterion weight;
   searching, by the processor, the first location using the first search criterion afforded the new first search criterion weight and the second search criterion afforded the new second search criterion weight;
   replacing the first search target with a second search target, the second search target being a graphical representation of a second location, the graphical representation of the second search target being different from the graphical representation of the first location, comprising bounds within which a search is conducted; and
   searching, by the processor, the second location using the first search criterion afforded the first search criterion weight and the second search criterion afforded the second search criterion weight in response to the first search target being replaced with the second search target.

2. The method according to claim 1, further comprising:
   receiving an indication to move the first search criterion to a fifth distance from the search target, wherein the fifth distance corresponds to a revised first search criterion weight;
   calculating a revised second search criterion weight in response to the indication to move the first search criterion to a third distance from the search target; and
   searching the search target using the first search criterion afforded the revised first search criterion weight and the second search criterion afforded the revised second search criterion weight.

3. The method according to claim 1, further comprising:
   providing for display of search results; and
   updating the search results in response to the first search criterion being moved from a first distance to the search target to a fifth distance to the search target.

4. The method according to claim 1, further comprising:
   providing for display of search results; and
   ranking the search results by relevance in response to the first search criterion being afforded the first search criterion weight and the second search criterion being afforded the second search criterion weight.

5. The method according to claim 4, further comprising:
   re-ranking the search results by relevance in response to at least one of the first search criterion weight and the second search criterion weight being changed.

6. The method according to claim 1, wherein the first search criterion weight is changed in response to the distance between the first search criterion and the search target being changed.

7. The method of claim 1, wherein replacing the first search target with a second search target comprises performing a scrolling action from the first search target to the second search target in response to a user input at a user interface.

8. An apparatus comprising at least one processor and at least one memory including computer program code, the at least one memory and the computer program code configured to, with the at least one processor, cause the apparatus to:
   provide for display of a first search target;
   provide for display of a first search criterion disposed at a first distance from the first search target, wherein the first distance corresponds to a first search criterion weight;
   provide for display of a second search criterion disposed at a second distance from the first search target, wherein the second distance corresponds to a second search criterion weight;
   search a first location comprising the bounds within which the search is conducted as represented by the first search target using the first search criterion afforded the first search criterion weight and the second search criterion afforded the second search criterion weight;
   receive a change in position of the first search target, while the first search criterion and the second search criterion remain stationary, wherein in response to the change in position of the first search target the first search criterion is disposed at a third distance from the first search target and the third distance corresponds to a new first search criterion weight, wherein the second search criterion is disposed at a fourth distance from the first search target and the fourth distance corresponds to a new second search criterion weight;

search the first location using the first search criterion afforded the new first search criterion weight and the second search criterion afforded the new second search criterion weight;

replace the first search target with a second search target, the second search target being a graphical representation of a second location, the graphical representation of the second search target being different from the graphical representation of the first location, comprising bounds within which a search is conducted; and search the second location using the first search criterion afforded the first search criterion weight and the second search criterion afforded the second search criterion weight in response to the first search target being replaced with the second search target.

9. The apparatus according to claim 8, the apparatus further caused to:

receive an indication to move the first search criterion to a fifth distance from the search target, wherein the fifth distance corresponds to a revised first search criterion weight;

calculate a revised second search criterion weight in response to the indication to move the first search criterion to a fifth distance from the search target; and search the search target using the first search criterion afforded the revised first search criterion weight and the second search criterion afforded the revised second search criterion weight.

10. The apparatus according to claim 8, wherein the apparatus is further caused to:

provide for display of search results; and update the search results in response to the first search criterion being moved from a first distance to the search target to a fifth distance to the search target.

11. The apparatus according to claim 8, wherein the apparatus is further caused to:

provide for display of search results; and rank the search results by relevance in response to the first search criterion being afforded the first search criterion weight and the second search criterion being afforded the second search criterion weight.

12. The apparatus according to claim 11, wherein the apparatus is further caused to:

re-rank the search results by relevance in response to at least one of the first search criterion weight and the second search criterion weight being changed.

13. The apparatus according to claim 8, wherein the first search criterion weight is changed in response to the distance between the first search criterion and the search target being changed.

14. The apparatus of claim 8, wherein causing the apparatus to replace the first search target with a second search target comprises causing the apparatus to perform a scrolling action from the first search target to the second search target in response to a user input at a user interface.

15. A computer program product comprising at least one non-transitory computer-readable storage medium having computer-executable program code instructions stored therein, the computer-executable program code instructions comprising:

program code instructions for providing for display of a first search target;

program code instructions for providing for display of a first search criterion disposed at a first distance from the first search target, wherein the first distance corresponds to a first search criterion weight;

program code instructions for providing for display of a second search criterion disposed at a second distance from the first search target, wherein the second distance corresponds to a second search criterion weight;

program code instructions for searching a first location comprising the bounds within which the search is conducted as represented by the first search target using the first search criterion afforded the first search criterion weight and the second search criterion afforded the second search criterion weight;

program code instructions for changing a position of the first search target while the first search criterion and the second search criterion remain stationary, wherein in response to changing the position of the first search target, the first search criterion is disposed at a third distance from the first search target and the third distance corresponds to a new first search criterion weight, wherein the second search criterion is disposed at a fourth distance from the first search target and the fourth distance corresponds to a new second search criterion weight;

program code instructions for searching the first location using the first search criterion afforded the new first search criterion weight and the second search criterion afforded the new second search criterion weight;

program code instructions for replacing the first search target with a second search target, the second search target being a graphical representation of a second location, the graphical representation of the second search target being different from the graphical representation of the first location, comprising bounds within which a search is conducted; and program code instructions for searching, by a processor, the second location using the first search criterion afforded the first search criterion weight and the second search criterion afforded the second search criterion weight in response to the first search target being replaced with the second search target.

16. The computer program product according to claim 15, further comprising:

program code instructions for receiving an indication to move the first search criterion to a fifth distance from the search target, wherein the fifth distance corresponds to a revised first search criterion weight;

program code instructions for calculating a revised second search criterion weight in response to the indication to move the first search criterion to a fifth distance from the search target; and program code instructions for searching the search target using the first search criterion afforded the revised first search criterion weight and the second search criterion afforded the revised second search criterion weight.

17. The computer program product according to claim 15, further comprising:

program code instructions for providing for display of search results; and program code instructions for updating the search results in response to the first search criterion being moved from a first distance to the search target to a fifth distance to the search target.

18. The computer program product according to claim 15, further comprising:

program code instructions for providing for display of search results; and program code instructions for ranking the search results by relevance in response to the first search criterion being afforded the first search criterion weight and the second search criterion being afforded the second search criterion weight.

19. The computer program product according to claim 18, further comprising:

program code instructions for re-ranking the search results by relevance in response to at least one of the first search criterion weight and the second search criterion weight being changed.

20. The computer program product of claim 15, wherein the program code instructions for replacing the first search target with a second search target comprises program code instructions for performing a scrolling action from the first search target to the second search target in response to a user input at a user interface.

\* \* \* \* \*